(12) United States Patent
Oshima

(10) Patent No.: US 6,523,956 B2
(45) Date of Patent: Feb. 25, 2003

(54) MULTIPLEXED MOTION PICTURE CAMERA

(76) Inventor: Jon Oshima, 406 17th St., Brooklyn, NY (US) 11215

(*) Notice: Subject to any disclaimer, the term of this patent is extended or adjusted under 35 U.S.C. 154(b) by 0 days.

(21) Appl. No.: 09/851,774

(22) Filed: May 9, 2001

(65) Prior Publication Data

US 2002/0024635 A1 Feb. 28, 2002

Related U.S. Application Data

(60) Provisional application No. 60/203,157, filed on May 9, 2000.

(51) Int. Cl.[7] ............................................. G03B 1/00
(52) U.S. Cl. ........................................ 352/166; 352/67
(58) Field of Search ..................... 352/166, 67, 57, 352/49

(56) References Cited

U.S. PATENT DOCUMENTS

| | | | |
|---|---|---|---|
| 970,322 A | 9/1910 | Geisler | |
| 986,163 A | 3/1911 | Giordano | |
| 1,213,184 A | 1/1917 | Gaumont | |
| 1,451,774 A | 4/1923 | Holbrook et al. | |
| 1,454,418 A | 5/1923 | Wescott | |
| 1,593,053 A | 7/1926 | Ames | |
| 1,607,661 A | 11/1926 | Albert | |
| 1,629,974 A | 5/1927 | Russo | |
| 1,661,611 A | 3/1928 | Hamburger et al. | |
| 1,688,607 A | 10/1928 | Wright | |
| 1,783,399 A | 12/1930 | Ames | |
| 1,862,950 A | 6/1932 | Ball | |
| 1,873,259 A | 8/1932 | Ball | |
| 1,924,901 A | 8/1933 | Ball | |
| 1,936,114 A | 11/1933 | Luboshez | |
| 1,958,617 A | 5/1934 | Gilmore | |
| 1,988,882 A | 1/1935 | Thomas | |
| 2,006,213 A | 6/1935 | Halliday | |
| 2,027,369 A * | 1/1936 | Bourges | 352/133 |
| 2,029,703 A | 2/1936 | Luboshez | |
| 2,053,224 A | 9/1936 | Reason | |
| 2,072,091 A | 3/1937 | Ball et al. | |
| 2,153,892 A * | 4/1939 | Jackman | 352/133 |
| 2,189,932 A | 2/1940 | Ball et al. | |
| 2,200,358 A | 5/1940 | Haskin | |
| 2,204,049 A | 6/1940 | Planskoy | |
| 2,460,320 A | 2/1949 | Waldeyer | |
| 2,580,422 A | 1/1952 | Gunn | |
| 2,614,452 A | 10/1952 | Coote et al. | |
| 2,694,336 A | 11/1954 | Waldeyer | |
| 2,712,264 A | 7/1955 | Oakhill | |
| 2,723,821 A | 11/1955 | Kelly et al. | |
| 2,727,427 A * | 12/1955 | Jenkins | 348/722 |
| 2,745,312 A | 5/1956 | Sittig | |
| 2,753,395 A | 7/1956 | Lawrence | |
| 2,772,600 A | 12/1956 | Walker | |
| 2,854,901 A | 10/1958 | Fathauer | |
| 2,858,731 A | 11/1958 | Rehorn | |
| 2,896,503 A | 7/1959 | Smith | |
| 3,035,484 A | 5/1962 | Karavias | |
| 3,037,564 A | 6/1962 | Bruining | |
| 3,113,180 A | 12/1963 | Bingley et al. | |
| 3,224,829 A | 12/1965 | Forster | |

(List continued on next page.)

Primary Examiner—Russell Adams
Assistant Examiner—D. Ben Esplin
(74) Attorney, Agent, or Firm—Ostrager Chong & Flaherty LLP

(57) ABSTRACT

A multiplexed motion picture camera comprising a sturdy plate for supporting a plurality of camera mechanisms, each camera mechanism provided with an adjustable support device, and connected to a common objective lens through an arrangement of lenses, beam splitters, multiple axis optical relays, and additional shutter devices. Each camera mechanism and its associated optical relays, shutters, and lenses can be individually controlled and adjusted to allow an operator a broad range of photographic settings to achieve a smooth, continuous, natural motion moving image recording.

68 Claims, 13 Drawing Sheets

U.S. PATENT DOCUMENTS

| | | | |
|---|---|---|---|
| 3,317,662 A | 5/1967 | Robinson et al. ............ 178/5.4 |
| 3,380,794 A | 4/1968 | Montremy et al. |
| 3,546,374 A | 12/1970 | Graser ....................... 178/5.4 |
| 3,580,666 A | 5/1971 | Vance .......................... 352/90 |
| 3,602,582 A | 8/1971 | Torricelli ..................... 352/40 |
| 3,743,393 A | 7/1973 | Campbell ..................... 352/84 |
| 3,784,734 A | 1/1974 | Watanabe et al. ............ 178/5.4 |
| 3,791,724 A | 2/1974 | Hirata .......................... 352/91 |
| 3,804,976 A | 4/1974 | Gard .......................... 178/6.8 |
| 3,825,327 A | 7/1974 | Kosarko et al. .............. 352/29 |
| 3,834,788 A | 9/1974 | Campbell ..................... 352/84 |
| 3,908,082 A | 9/1975 | Pownall ...................... 178/7.2 |
| 3,913,116 A | 10/1975 | Kastner et al. ............. 354/223 |
| 3,955,887 A | 5/1976 | Toyama et al. ............. 352/166 |
| 4,052,126 A | 10/1977 | Freudenschuss et al. ...... 352/84 |
| 4,183,644 A | 1/1980 | Tureck et al. ................ 354/77 |
| 4,222,653 A | 9/1980 | Beiser ....................... 354/270 |
| 4,249,805 A | 2/1981 | Hilbert et al. ................ 352/85 |
| 4,255,033 A | 3/1981 | Rose ......................... 354/110 |
| 4,275,412 A | 6/1981 | Contant ....................... 358/55 |
| 4,375,913 A | 3/1983 | Hajnal ......................... 354/79 |
| 4,420,231 A | 12/1983 | Gottschalk ................. 352/142 |
| 4,457,599 A | 7/1984 | Sawicki ....................... 352/89 |
| 4,527,872 A * | 7/1985 | Gentleman et al. ........... 352/47 |
| 4,545,662 A | 10/1985 | Chalono ..................... 354/118 |
| 4,557,570 A | 12/1985 | Hines ........................ 354/113 |
| 4,580,886 A | 4/1986 | Hajnal ......................... 354/79 |
| 4,823,202 A | 4/1989 | Morizumi ................... 358/294 |
| 4,847,693 A | 7/1989 | Eppolito ..................... 358/225 |
| 4,868,588 A | 9/1989 | Hajnal |
| 5,087,986 A | 2/1992 | Hunt et al. .................. 359/629 |
| 5,189,556 A | 2/1993 | Ohtsuka ..................... 359/634 |
| 5,210,612 A | 5/1993 | Furuta et al. .......... 358/213.11 |
| 5,223,867 A * | 6/1993 | Nguyen-Nhu ............... 352/180 |
| 5,264,694 A | 11/1993 | Diehl et al. .............. 250/208.1 |
| 5,285,225 A | 2/1994 | Blaschek et al. .............. 352/93 |
| 5,285,255 A | 2/1994 | Baranne et al. ............. 356/328 |
| 5,361,106 A | 11/1994 | Ashbey ....................... 352/57 |
| 5,365,375 A | 11/1994 | Monari ...................... 359/629 |
| 5,418,769 A | 5/1995 | Inoue ......................... 369/112 |
| 5,469,236 A | 11/1995 | Roessel ....................... 354/79 |
| 5,650,815 A | 7/1997 | Dasso ......................... 348/42 |
| 5,654,752 A | 8/1997 | Yamazaki ................... 348/208 |
| 5,694,165 A | 12/1997 | Yamazaki et al. .......... 348/218 |
| 5,727,236 A * | 3/1998 | Frazier ...................... 359/434 |
| 5,727,242 A | 3/1998 | Lo et al. ..................... 396/324 |
| 5,745,296 A | 4/1998 | Nakamura et al. .......... 359/641 |
| 5,940,126 A | 8/1999 | Kimura ...................... 348/294 |

* cited by examiner

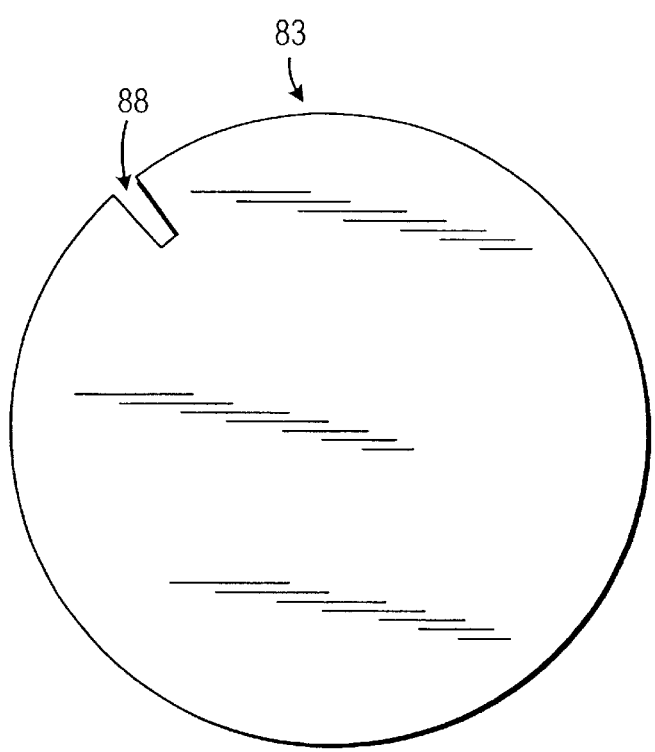
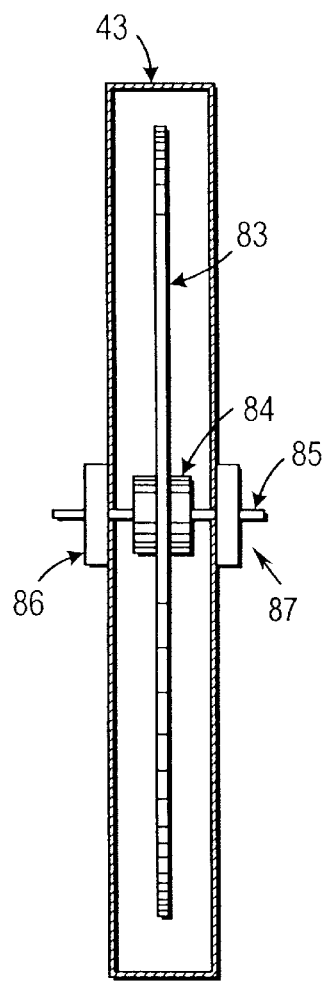
FIG. 8
FIG. 9

MULTIPLEXED MOTION PICTURE CAMERA

This application claims the benefit of and incorporates by reference herein U.S. Provisional Application No. 60/203,157, filed May 9, 2000.

FIELD OF THE INVENTION

This invention relates generally to film, video, and electronic imaging technology and, more particularly, to an apparatus and method for special effects moving image photography.

BACKGROUND OF THE INVENTION

In photography and image processing every method and piece of equipment has both advantages and limitations when it comes to manipulating the visual qualities of images. Inventors have attempted to overcome limitations on, and add functionality to, certain prior art camera devices by devising systems which produce, and in some cases record, multiple optical images.

One group of such prior art consists of camera devices designed to use black and white film to reproduce color images. In these devices each of the multiple image paths is filtered to transmit a different portion of the color information. An example of such a camera device is shown in U.S. Pat. No. 2,027,369 to Bourges, which discloses multiple motion picture cameras, each fitted with an objective lens, which are mounted together in a unit, and combined with multiple beam splitter mirrors positioned in front of their objective lenses such that the resulting angle of view of the cameras is identical.

The use of beam splitter mirrors in front of multiple objective lenses creates significant optical limitations. A two camera arrangement which uses a single such mirror will limit how wide-angle the objective lenses can be without "vignetting" the image. In a system with three or more cameras such as the Bourges device, (and with the resulting need for multiple beam splitter mirrors) the problem would be acute. It is also practically impossible to use zoom lenses in such a system, because of the difficulty of matching their focal lengths.

Camera devices that create multiple optical images of other configurations are also known in the art. One such group of prior art consists of so called "three chip" video cameras, which utilize three electronic image sensors to produce color images. An example of one of these devices is U.S. Pat. No. 4,275,412 to Contant, which discloses a beam splitter prism positioned behind a single, shared objective lens, with the prism used to divide the image produced by the objective lens and direct a copy of that image to each of three electronic imaging sensors. Placing the beam splitter behind the objective overcomes the above-described limitations, and prisms are conventional to be optically superior to mirror or pellicle beam splitters for this purpose. These prior art devices create multiple optical images, but the individual sensors are incapable of producing images that contain complete picture information. A combination of the information from all of the sensors is necessary to reproduce the color of the original scene. The limitation is the same whether the cause is filters inserted in each optical path or the design of the imaging sensors.

This type of video camera is also limited by the fact that it is incapable of making separate recordings of the images produced by the multiple imaging sensors. Information from the three sensors is first combined electronically, and a single recording is made of the combined information. These camera devices are further restricted by the limited functionality of their electronic image combination means. The above limitations prevent such camera devices from realizing potential additional advantages of utilizing multiple, rather than single, image sensors or film strips.

Camera devices that utilize multiple image recording devices in combination with a beam splitter positioned behind an objective lens are also disclosed in the prior art. One example of such a device is a device designed to use black and white film to reproduce color images. This device discloses three film transport mechanisms associated with multiple image paths, each of which is filtered to transmit a different portion of the color information, and all of which are synchronized to make their separate exposures simultaneously. As part of the original "Technicolor" process, the filtered images were developed and combined in a motion picture film laboratory.

The synchronization of the multiple camera mechanisms is maintained to a very high degree of precision because, if they were not, the resulting images would be rendered unusable by color distortions. Precise adherence to the synchronization pattern is insured by fixed mechanical interconnections between the multiple camera mechanisms, and between those mechanisms and the camera's motor. The fact that it includes no provision for individually adjusting the "speed" (frames per second/f.p.s.), and the synchronization or relative timing of the three camera mechanisms prevents this camera device from realizing potential additional advantages.

Another example disclosed in the prior art is not as limited. This device is specifically designed to produce the effect of an instantaneous change from conventional to slow motion moving images. The effect is completed by editing or "cutting" from an image sequence recorded at one camera speed to an image sequence recorded at a different camera speed. In order to create the required image sequences this device allows two camera mechanisms with a matching point of view to operate at different speeds relative to each other. This device is limited by the fact that there is no incorporated or extent device compatible with this or other camera devices for coordinating or synchronizing in a precise manner the exposure cycles of cameras operating at different speeds and/or when the exposure cycles of those cameras are synchronized and offset relative to each other, and the cameras are operating at low speeds, i.e., below 15 f.p.s.

Certain other limitations on the above described prior art devices result from the fact that their film strips or image sensors are exposed directly to the image formed by an objective lens. In such an arrangement there is only a short distance between the rear of the objective lens and the focal planes of the multiple images. Consequently there is extremely limited space available for a beam splitter prism and the associated film gate structures or image sensor devices. These space restrictions prevent the use of larger camera mechanisms such as existing film or video cameras, and necessitate the use instead of specially constructed and permanently installed camera mechanisms or electronic image detectors.

One solution to these space restrictions calls for the use of optical relays. Optical relays, which extend the distance between the rear of an objective lens and the focal plane of the image sensor or film gate into which the final image is projected, are generally known in the prior art for use with a single camera device. An example of a motion picture camera optical relay is shown in U.S. Pat. No. 5,727,236 to Frazier, which discloses an arrangement of an objective lens, a field lens and a relay lens such that the image originally formed by the objective lens is transmitted by the other lenses to the film of a film camera or the electronic imaging detector of a video camera. The Frazier device and others also allow the focus of the final image to be adjusted by the relay lens instead of the objective lens. However, the prior art has failed to provide a multiple axis optical relay having a plurality of associated camera mechanisms.

The ability of prior art moving image camera devices, including those which produce multiple images, to control the extremely short "bursts" of electronic flash lighting is also restricted by limitations in conventional camera shutters. A conventional flash device currently in use in the motion picture industry emits light in bursts that have a duration of $1/100,000$th of a second. In contrast, the conventional shutter in a typical professional film camera, limited by its relatively compact size, and operated at normal camera speed (i.e., 24 f.p.s.), can generate a maximum shutter "speed" (minimum exposure time) of only $1/200$th of a second. A potential advantage of multiple image camera devices over conventional cameras in regard to manipulating the visual qualities of flash illuminated images is therefore limited by the inability of conventional camera shutters to operate at higher "speeds".

It is therefore a broad object of this invention to provide an improved multiple moving image sequence recording camera device, which may be used to create a broad variety of image manipulations and visual effects.

A more specific object of the present invention is to provide a camera apparatus capable of creating, and making moving image recordings of multiple, matching, high-quality copies of an image originally produced by an objective lens.

Another object of the present invention is to provide a camera apparatus capable of making separate adjustments to multiple aspects of the photographic characteristics of each of those image copies. In particular, a camera apparatus capable of making separate and wide ranging adjustments to the focus, f-stop, and shutter speed characteristics of multiple images.

A still further object of the invention is to provide a multiple moving image recording device distinguished by its ability to control the temporal characteristics of the exposure cycles of its component camera mechanisms, both individually and in relation to each other, in a manner that is both adjustable and precise. In particular, a device capable of offsetting the timing of the exposure cycles of each component camera relative to the other cameras in increments of a small fraction of a cycle, and maintaining with a high degree of precision the degree to which they are offset. Furthermore, a device capable of maintaining a given synchronization pattern for its component camera devices even if their exposure cycles are offset, and/or running at different speeds, and/or the synchronization pattern itself changes over time, and/or they are operating at lower than normal frame rates.

SUMMARY OF THE INVENTION

In the present invention these purposes, as well as others which will be apparent, are achieved generally by providing a sturdy plate for supporting a plurality of camera mechanisms, each camera mechanism provided with an adjustable support device, and connected to a multiple axis optical relay, which may contain additional shutter devices. Each camera mechanism and its associated optical relays, shutters, and lenses can be individually controlled and adjusted to allow an operator a broad range of photographic settings to achieve a smooth, continuous, natural motion moving image recording.

The present invention provides the ability to create and record multiple, matching, high-quality copies of an image originally produced by an objective lens. The camera also has the ability to make separate adjustments to multiple aspects of the photographic characteristics of each of those image copies. In particular, it is possible to adjust the focus and f-stop of each image. Further, the camera has the ability to control the temporal characteristics of the exposure cycles of its component camera mechanisms, both individually and in relation to each other, in a manner that is both adjustable and precise. Unlike the prior art, the present invention is capable of offsetting the timing of the exposure cycle of each component camera relative to the other cameras in increments of a small fraction of a cycle, and maintaining with a high degree of precision the degree to which they are offset. Moreover, the camera can maintain a given synchronization pattern for its component camera mechanisms even if their exposure cycles are offset and/or running at different speeds and/or the synchronization pattern itself changes over time.

The combination of the above described features results in the ability of the present invention to record overlapping segments of time. In turn, that ability makes it possible for the present invention to utilize longer exposure times than prior art camera devices. The present invention further affords an operator a wider range of options for the defining the temporal characteristics of individual exposures. Shutter means in the present invention are capable of exposing or blocking the exposure of the entire frame for much shorter intervals of time than are the shutters in the prior art. The present invention is also capable of more complicated exposure patterns than the prior art. Specifically, its shutters are distinguished by an ability to intervene during an ongoing exposure; each intervention consisting of a momentary, full frame blockage of the ongoing exposure.

Accordingly, a problem has existed heretofore in the fields of motion pictures and video—namely that the ability of practitioners in those fields to manipulate the visual characteristics of the moving images that they create has been impeded by a set of limitations inherent in the prior art. From all the foregoing it can be appreciated that the prior art has not solved the problem of providing the practical means or methods necessary for overcoming those limitations, and for creating a variety of visual effects by creating and manipulating multiple optical images, and by manipulating the recording and subsequent combination of multiple related moving image sequences.

Other objects, features and advantages of the present invention will be apparent when the detailed description of the preferred embodiments of the invention are considered in conjunction with the drawings which should be construed in an illustrative and not limiting sense, as follows:

BRIEF DESCRIPTION OF DRAWINGS

FIG. 8 is an illustration showing a first shutter disc for use in the multiplexed motion picture camera in accordance one embodiment of the invention.

FIG. 9 is a side view of a shutter for use in the multiplexed motion picture camera in accordance with one embodiment of the invention.

DESCRIPTION OF THE PREFERRED EMBODIMENTS

Figure 1:
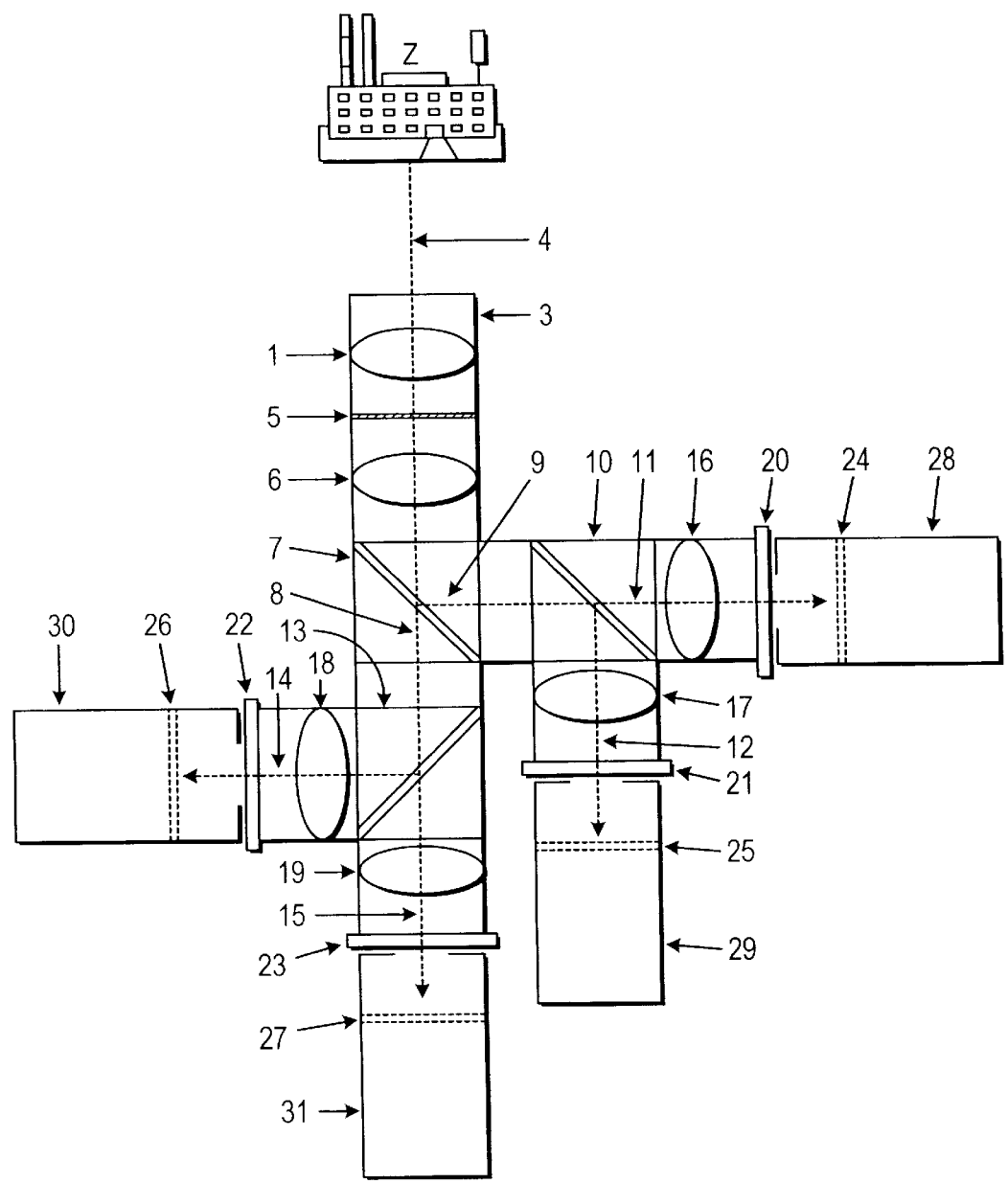
FIG. 1 is an illustration showing a top plan view of the optical system for a multiplexed motion picture camera in accordance with one embodiment of the invention.

This invention is directed to a multiplexed motion picture camera having particular application in the entertainment industry, including, without limitation, the television and motion picture industries, and methods for using the multiplexed motion picture camera to achieve improved and special effect moving image recordings. The camera is intended for field use and therefore should be relatively compact and lightweight, although larger, more complex cameras could be designed in accordance with the teachings herein for studio use. By way of illustration, the multiplexed motion picture camera described and shown herein includes four image recording devices (camera mechanisms) positioned behind a common objective lens and a multiple axis optical relay including a series of beam splitters and other lenses, all arranged to be individually controlled and separately adjustable. However, the concepts shown in these drawings and described herein may be applied to many other arrangements, provided the camera includes at least two image recording devices.

As used herein, the term "camera" shall mean the multiplexed motion picture camera in accordance with the invention and the term "camera mechanism" shall mean and include any image recording device having its objective lens removed. The terms "lens", "lenses", "lens group" and "lens means" shall mean and include any form of single lens or multiple element lens, with or without an iris for aperture adjustment, and any such lens either can be selected from commercially available lenses or lenses specifically created, modified or designed for use in the optical system of this invention.

A camera arranged in accordance with this invention is capable of recording multiple image sequences by employing optics to create multiple copies of the image formed by an objective lens; by employing multiple image detector elements and exposing each element to one of the image copies; and by employing multiple camera mechanisms, each of which is used in conjunction with one of the image detector elements. The timing and/or photographic characteristics of each of the multiple recordings can be controlled independently of the others.

Further, the camera can be configured so that its multiple optical images match each other, and each image detector can fully reproduce the image originally produced by the objective lens. In actual practice, the camera may create effects by recording for subsequent recombination image sequences that differ in at least one respect from the original image and/or from each other. One significant advantage of the present invention over the above described prior art and an essential element in its unique functionality is the fact that it allows an operator to choose the type and degree of the differences between multiple optical images. The potential of the present invention to create complete and matching images insures that an operator is presented with the widest possible range of options for ways to modify those images.

The camera is also capable of controlling very precisely the timing of the exposures made by multiple camera mechanisms and operating each camera mechanism at different synchronization patterns and speeds. In particular, the camera is able to record overlapping segments of real time, which provides superior ability to utilize long exposure times, and thereby a superior ability to exploit motion blur effects.

Moreover, it is possible for each component camera mechanism in the camera to photograph a different plane of focus within the image created by the common objective lens. In the prior art, focus is manipulated by adjusting the objective lens itself, which produces an equal and matching change in every image. When desirable, it is possible to do the same with the camera of this invention, but it is also possible to make separate adjustments to the focus of each of the multiple images by the adjusting the optical relays, thereby giving each version of an image different focus characteristics. For example, the camera can record sharp images of two subjects that are at very different distances from the camera. Separately adjusting the f-stop of each of the multiple images may be accomplished by equipping the optics in each of the relays with a diaphragm mechanism. The camera of this invention also represents an improvement in controlling electronic flash lighting by using a high-speed shutter in combination with a conventional camera mechanism shutter.

Referring now the drawings, FIG. 1 illustrates an arrangement of the camera's optical system. Objective lens 1 is aligned on optical axis 4, and forms a first or intermediate image 5 of the photographed subject Z inside supporting tube 3. The first element in the optical relay, field lens or lens group 6 is movably positioned on optical axis 4 behind the objective lens towards the camera mechanisms inside supporting tube 3. The purpose of the field lens group 6 is to transform the intermediate image 5 into an aerial image, and transmit that image through the subsequent beam splitters to a second part of the optical relay. A beam splitter 7 divides optical axis 4 into optical axis 8 and optical axis 9. The purpose of this and any subsequent beam splitters is to divide the optical path into two or more optical paths carrying identical aerial images. Reference to "beam splitter", "beam splitters", or "beam splitter means" in this specification and in the claims is intended to mean any type of beam splitter, including, without limitation, prisms, mirrors or pellicles. The various beam splitter means required for the present invention may be embodied with any commercially available beam splitter, or with especially modified, designed, or created beam splitters. Furthermore, the reference to "prism beam splitter" is not limited to the below described cube type geometry, and shall mean and include any shape prism, and any combination of prisms into a beam splitter. Use of alternative prism beam splitter geometries shall be understood to create the possibility of different angles of reflection by the prisms, and consequent variations in the layout of the optical paths and positioning of the various elements. Beam splitter 7 may be, for example, a 100 mm cube beam splitter, said beam splitter comprising two right angle prisms joined together on their respective hypotenuse faces, with a semi-transparent coating on one or both of the joined faces, such coating transmitting approximately 50% of the light and reflecting the remaining approximately 50% of the light. Beam splitter 7 is disposed such that two faces are perpendicular to optical axis 4, and the plane of the semi-transparent coating is perpendicular to optical axis 4 in the vertical dimension and at a 45° degree angle to optical axis 4 in the horizontal dimension such that optical axis 9 is deflected at a 90° angle to optical axis 4. Optical axis 8 is an undeflected continuation of optical axis 4, and optical axis 9 is a deflected extension of optical axis 4, deflected by the operation of the beam splitter at a 90° angle to optical axis 4.

An additional beam splitter 13, positioned in a similar manner to beam splitter 7, divides optical axis 8 into optical axis 15 (an undeflected continuation of axis 8) and optical axis 14, (a deflected extension of optical axis 8, deflected by the operation of the beam splitter at a 90° degree angle to optical axis 8). An additional beam splitter 10, positioned in a similar manner to beam splitter 7, divides optical axis 9 into optical axis 11 (an undeflected continuation of axis 9) and optical axis 12, (a deflected extension of optical axis 9, deflected by the operation of the beam splitter at a 90° degree angle to optical axis 9).

In the preferred embodiment, beam splitters 7, 10, and 13, are matching. Furthermore, in the preferred embodiment, all beam splitter means shall in their operation modify as little as possible the characteristics of the images which pass through them, excepting the previously mentioned lessening of the intensity of each image subsequent to, and in consequence of the dividing action of the prism. Regardless of the type, size, or particular geometry of the beam splitter means chosen to embody the present invention, the multiple optical paths should be configured, insofar as possible, to minimize and equalize any distortion of the images they transmit. One inherent problem is the fact that the partially reflective coatings in the beam splitter means have a different effect on light transmitted through them in comparison to light reflected by them. This problem is exacerbated when multiple beam splitters are configured in a sequence. In order to determine the appropriate compensation, the present invention is set up to view color balance and brightness reference materials, and separate measurements are made, either directly, or from a recorded image, of the different distortions imposed by each optical path. Compensation is available in two well known forms: color compensation filters interposed into each optical path during photography, or color correction implemented photographically or electronically after photography.

Relay lens groups 18 and 19 are movably positioned on axis 14 and 15 respectively. The purpose of each of these second relay elements is to transform the aerial image into a real or final optical image which is a re-creation of the intermediate image 5 formed by the objective lens 1, and focus that final image onto the film plane or electronic imaging detector plane in its associated camera. Additional shutters 22 and 23 are positioned in close proximity to lens groups 18 and 19 respectively, either in front or behind. Relay lens groups 18 and 19 each form a second or final image 26 and 27 respectively on the film plane or the electronic image detector plane of cameras 30 and 31 respectively. In this case "camera" means an image recording means without its normally associated objective lens. Various kinds of cameras can be used, so long as they can be synchronized with each other in the appropriate manner. However, the number and quality of effects that any particular embodiment of the present invention is capable of is governed primarily by two features of its component camera mechanisms: f.p.s./sampling rate and shutter speeds. As the range of potential frame rates and shutter speeds increases the number and quality of the effects which the present invention is capable of also increases.

The preferred embodiment of this invention utilizes film-based motion picture cameras, because, unlike current electronic imaging/video cameras, they offer a wide and easily adjusted range of frame rates. However, in the absence of concern with the limitations on current video technology in regard to the range of available shutter speeds and f.p.s./sampling rates, and any resulting limitations on the capabilities of the present invention, there is no distinction between the two kinds of cameras insofar as the present invention is concerned. If electronic imaging/video cameras are utilized, then they may or may not include an associated image recording means, such as a videotape recorder or a disc drive. The component cameras can also manipulate a second feature, the shutter speed of each of the recordings. A film camera equipped with an appropriate adjustable shutter will provide a range of shutter angles/speeds sufficient for most effects.

Relay lens groups 16 and 17 are movably positioned on axis 11 and 12 respectively. Additional shutter 20 is positioned in close proximity to lens groups 16, either in front or behind. Additional shutter 21 is positioned in close proximity to lens groups 17, either in front or behind. Relay lens groups 16 and 17 each form a second or final image 24 and 25 respectively on the film plane or the electronic image detector plane of cameras 28 and 29 respectively.

Relay lens groups 16, 17, 18, and 19 each include an adjustable iris. Furthermore, the position of each lens group is adjustable, for the purpose of adjusting the focus of the final image formed at the plane of focus within its associated camera. The lens groups are moved such that the faces of the lens elements remain perpendicular to the optical axis, and their axis of movement is parallel to the optical axis.

Simplified versions are included within the scope of the present invention, including versions that utilize other numbers and combinations of beam splitter means, with consequent differences in the number of optical paths, and thereby of images. Other simplified versions utilize only some or none of the additional shutters. Another simplified version of the present invention only utilizes some or none of the adjustable focusing means for the relay lens group in each optical path. An additional simplified version of the present invention does not utilize optical relay elements, including field lens or lens group 6, or relay lens groups 16, 17, 18, and 19. Various combinations of the above mentioned elements may be combined in, or eliminated from versions of the present invention.

Figure 2:
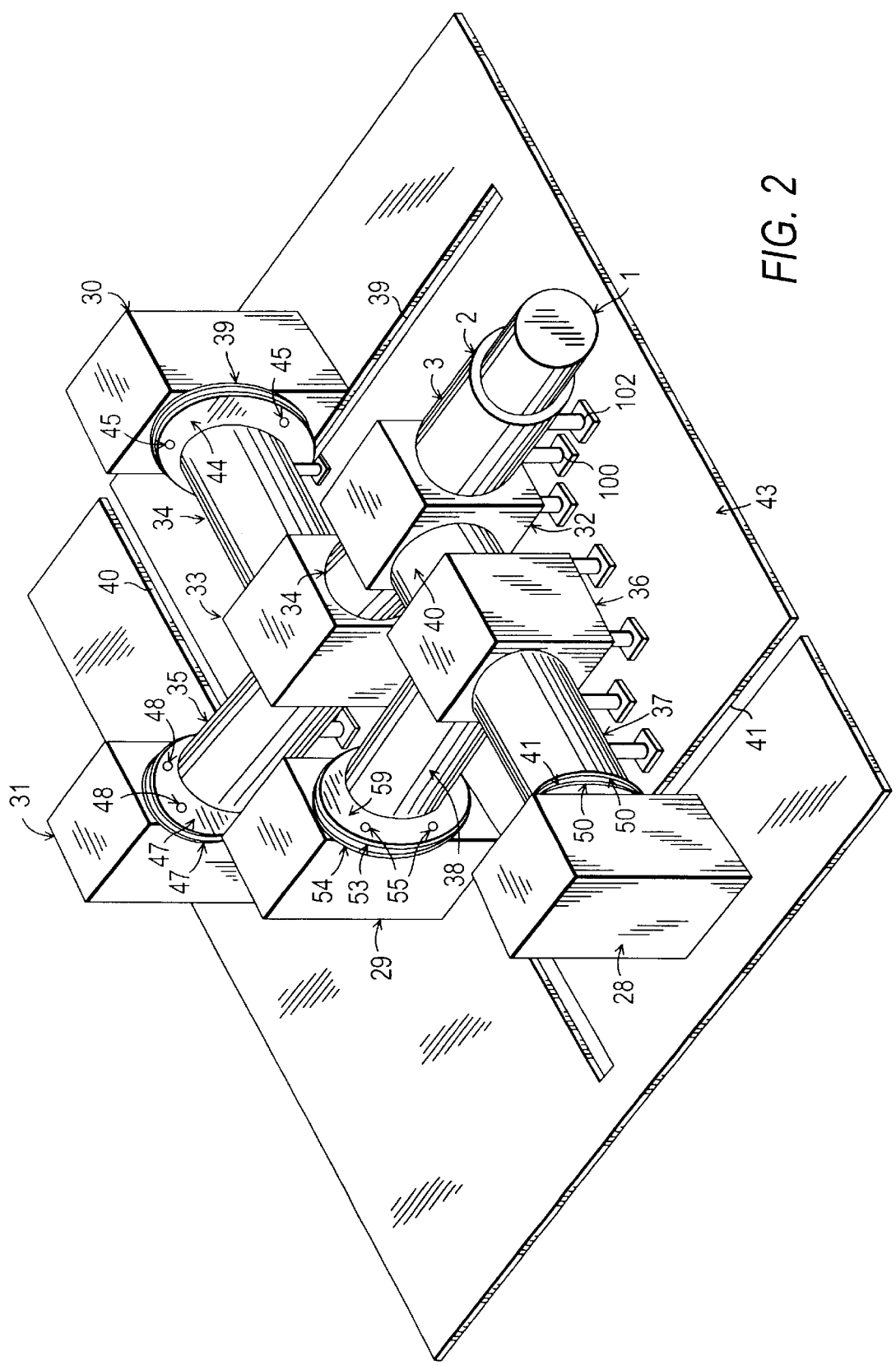
FIG. 2 is a perspective view of a multiplexed motion picture camera in accordance with one embodiment of the invention.

Referring now to FIG. 2, the physical structure of the optical system is shown. Generally, the components of the optical system are enclosed within structures such as tube segments (e.g., 37) and boxes (e.g., 36), which exclude ambient light and provide substantial support. Each of these optical component holding structures is connected to an underlying plate 43, similar in function to an optical laboratory breadboard table, of sufficient rigidity to maintain the positional integrity in the vertical dimension of the optical system, and of sufficient size to support all of the components of the present invention. The individual optical component holding tubes and boxes are generally raised above plate 43, and connected to it by one or more rod segments 100. Each rod segment 100 is rigidly attached to an associated optical component holding box or tube, and ternminates at the bottom end in a rigidly attached flange 102, the flat plane of which is perpendicular to the axis defined by the associated rod. The flange 102 is large enough to provide a margin around the rod segment 100 for holes to accommodate fasteners with which the combination holding tube or box and associated support rod segment 100 and flange 102 is rigidly yet removably attached to the plate 43.

Figure 4:
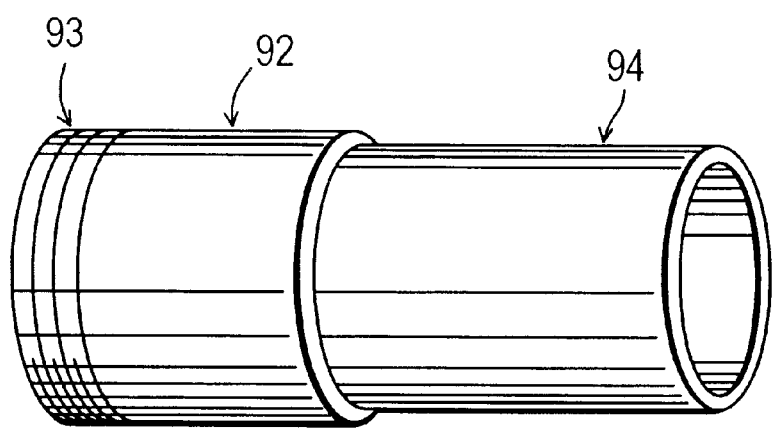
FIG. 4 is a side view of a sleeve tube for use in connecting elements of a multiplexed motion picture camera in accordance with the invention.

Objective lens 1 is detachably connected by a standard lens mount, which may be for example a Nikon bayonet mount, to compatible lens mounting port 2 on the face of enclosed supporting tube 3. Field lens or lens group 6 is positioned inside tube 3. Tube 3 is detachably connected to enclosure box 32. Generally, the tubes and boxes are detachably connected. Such connection is not principally intended to provide support or maintain the orientation of the optical components, those functions being provided by the rod segments 100 described above in combination with plate 43. The connection between tubes and boxes does, however, maintain the necessary continuity of the light blocking enclosure, while permitting the inspection, cleaning, and removal of individual components of the optical system. The connection between holding structures, as shown in FIG. 4, may be effected by a sleeve tube 92 equipped with a male thread on one end 93, positioned to envelope an end portion of a first enclosure tube 94, rotated into a female threaded port attached to a second enclosing tube or box. The length and inside diameter of these connective sleeves is proportioned to permit sliding movement of the sleeve over the outside diameter of an enclosure tube, while minimizing angular misalignment. The above described connection means is intended as an illustration only, and does not limit the present invention to such means.

Enclosure box 32, containing beam splitter 7 is connected to enclosure box 33 by enclosure tube 34, and to enclosure box 36 by tube 40, said tubes being detachably connectable at both ends. The minimum length of enclosure tubes 34 and 40 is determined by the minimum acceptable distance between camera devices 29 and 31.

Figure 3:
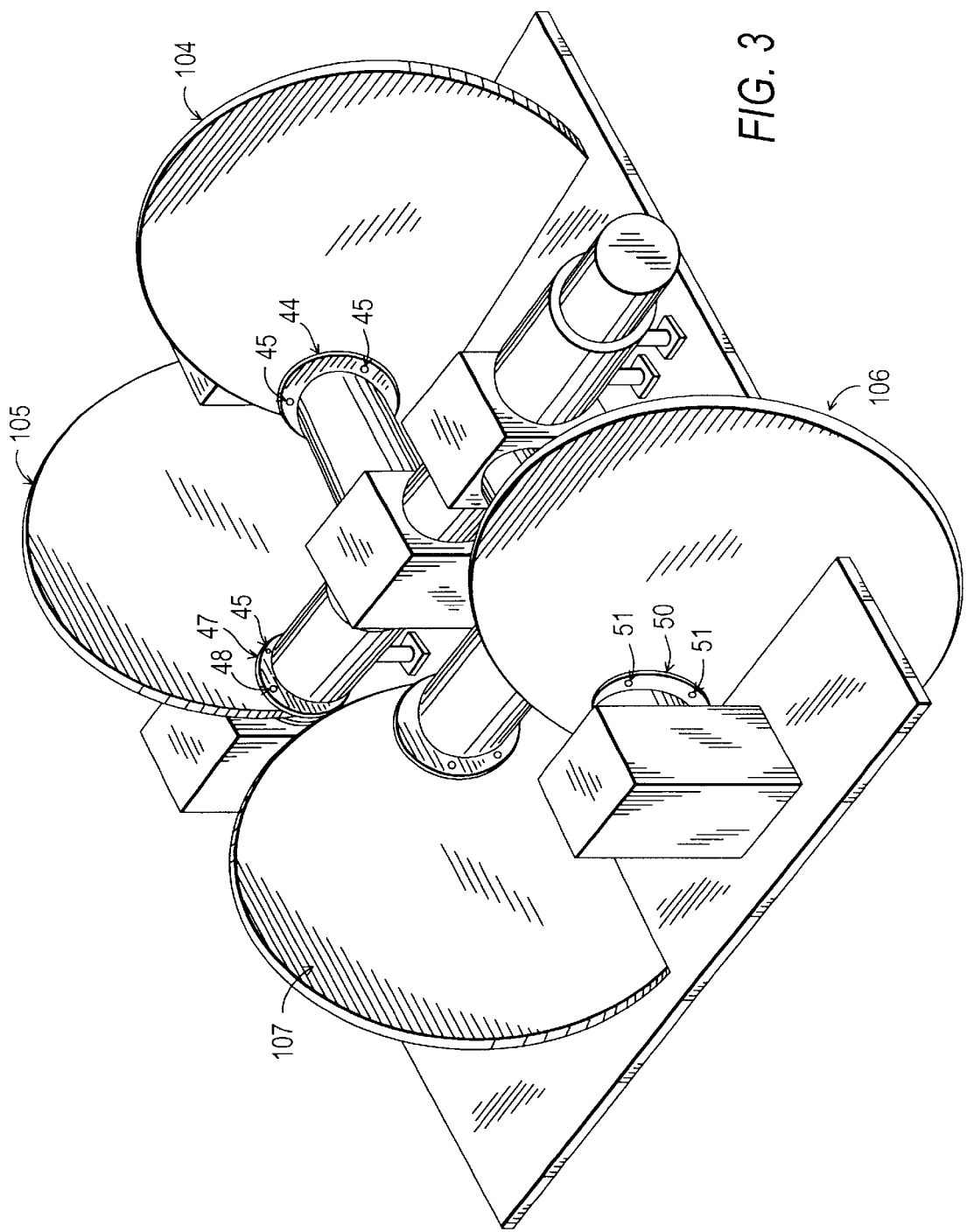
FIG. 3 is a perspective view of the multiplexed motion picture camera shown in FIG. 2 with shutter disc enclosures attached.
Figure 5A:
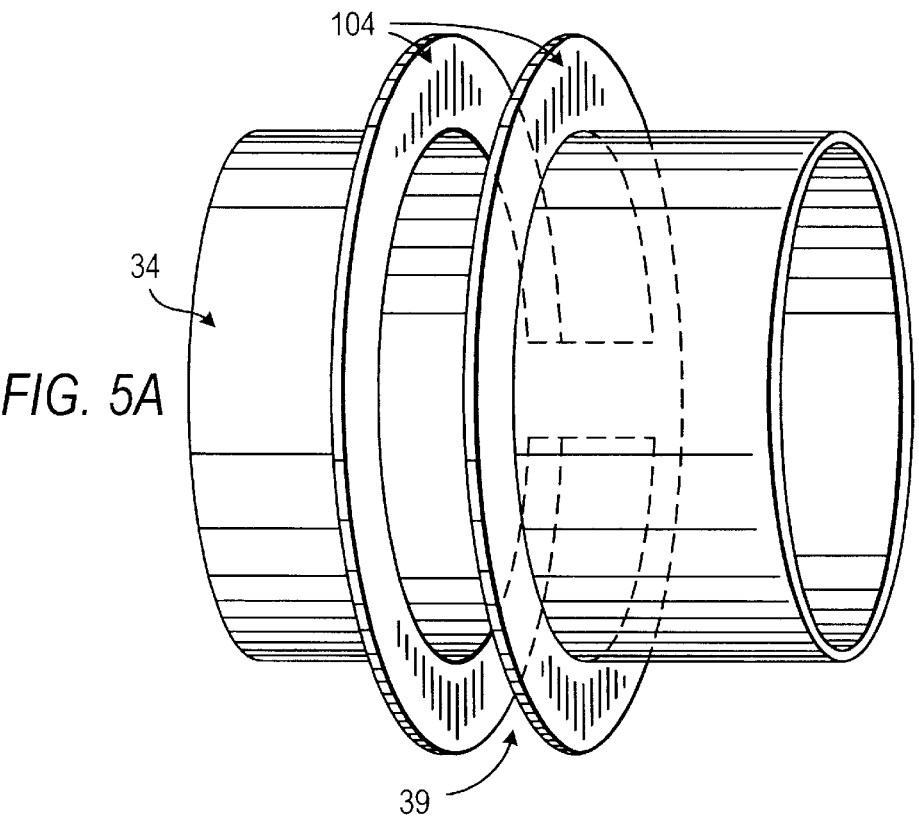
FIGS. 5A and 5B are right and left side views of a shutter attachment means used in a multiplexed motion picture camera in accordance with one embodiment of the invention.
Figure 5B:
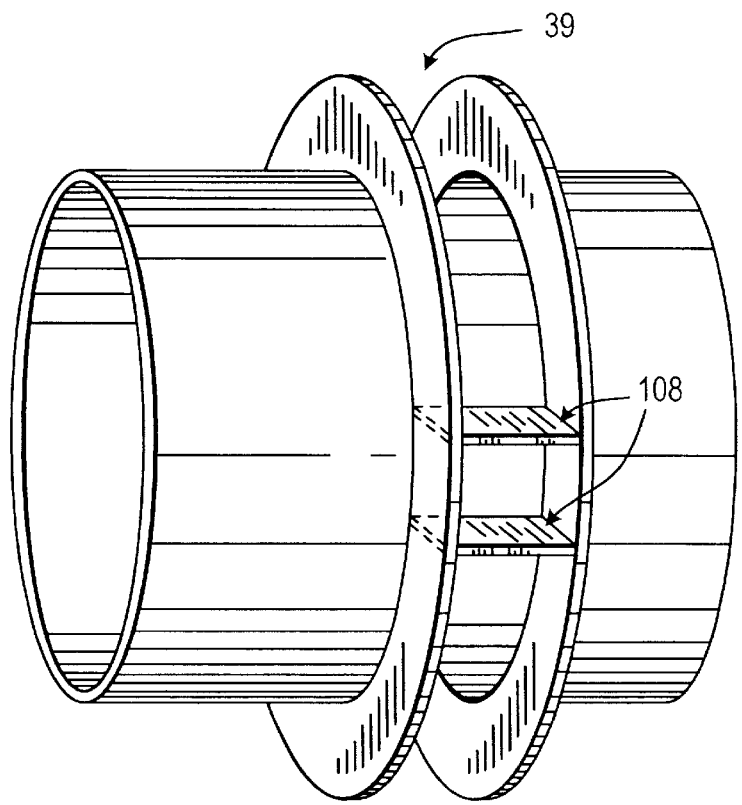

Enclosure box 33, containing beam splitter 13, is detachably connected to enclosure tube 34, which contains relay lens group 18 and is connected to shutter disc enclosure 104, said shutter disc enclosure being inserted into access slot 39 (see FIG. 3). Shutter access slot 39, as seen in FIG. 2, is principally an opening in the otherwise continuous surfaces of enclosure tube 34 and support plate 43. Referring to FIGS. 5A and 5B, the shutter access slot 39 comprises a space defined by two straight, parallel edges 104 transversing a majority of the diameter of the tube 34 at an angle perpendicular to the sides of the tube, and terminating on either end in two straight, parallel edges 108, of a dimension being approximately 0.5 inches in length, at an angle parallel to the sides of the tube. Access slot 39 and associated disc enclosure 104 are oriented principally to the front of the invention, as depicted in FIG. 3, to avoid intersecting other camera elements. Attached to, and surrounding access slot 39 is docking receptacle 44, configured to fit closely around shutter disc enclosure 104 for the purpose of excluding ambient light. Shutter disc enclosure 104 is removably connected to receptacle 44 by fasteners 45.

Enclosure box 33 is also detachably connected to enclosure tube 35, which contains relay lens group 19 and is removably connected to shutter disc enclosure 105, said shutter disc enclosure being inserted into access slot 40 and surrounding docking receptacle 47, and held in place by fasteners 48. Access slot 40 and associated disc enclosure 105 are oriented principally to the right as seen from above and depicted in FIG. 3, to avoid intersecting other camera elements. Enclosure box 36, containing beam splitter 10, is detachably connected to enclosure tube 37, which contains relay lens group 16 and is removably connected to shutter disc enclosure 106, said shutter disc enclosure being inserted into access slot 41 and docking receptacle 50, and held in place by fasteners 51. Access slot 41 and associated disc enclosure 106 are oriented principally to the front of the device, or away from the objective lens as depicted in FIG. 3, to avoid intersecting other camera elements.

Enclosure box 36 is also detachably connected to enclosure tube 38, which contains relay lens group 17 and is removably connected to shutter disc enclosure 107, said shutter disc enclosure being inserted into access slot 53 and docking receptacle 54, and held in place by fasteners 55. Access slot 53 and associated disc enclosure 107 are oriented principally to the left as seen from above and depicted in FIG. 3, to avoid intersecting other camera elements. Please replace the paragraph at page 19, lines 1–6 with the following:

Camera devices 28, 29, 30, and 31, equipped with standard camera ports, are detachably connected to enclosure tubes 37, 38, 34, and 35 respectively by standard lens mounts. The lens mount and associated port combination utilized in the preferred embodiment is a professional motion picture bayonet lens mount of the type known as ARRIFLEX. However, any connection means associated with an appropriate type of camera is acceptable.

Camera devices 28, 29, 30, and 31, equipped with standard camera ports, are detachably connected to enclosure tubes 37, 38, 34, and 35 respectively by standard camera mounts. The camera mount and associated port combination utilized in the preferred embodiment is a professional motion picture bayonet lens mount of the type known as ARRIFLEX. However, any camera mounting means associated with an appropriate type of camera is acceptable.

Relay lens groups 16, 17, 18, and 19 are each mounted in a conventional lens movement assembly, such as a helicoid barrel assembly. Each movement assembly is incorporated into the associated enclosure tube as a segment, and the exterior is provided with markings to indicate the focus setting of the enclosed relay lens group. The relay lens groups can be focused individually, or in connection with other relay lens groups. Each of the lens movement assemblies is equipped with means for hand operation, such as a knurled ring, as well as means for connection with an external source of mechanical movement, such as a geared ring attached to the rotatable exterior of a helicoid barrel assembly. An assembly of power transmission elements (such as gears and shafts) similar to the assembly shown in FIGS. 6 and 7 (described below) may be provided to interconnect, at the discretion of the operator, two or more of the lens assemblies so that their operation is synchronous and equal.

An additional element is required to complete the present invention, an element that performs three related functions. In instances where the present invention is embodied with film technology this element provides mechanical motion for each camera's interconnected shutter and film advance mechanisms. It is also the means for controlling the "speed" (f.p.s./sampling rate) of those cameras. Finally, it is the means for adjusting and maintaining their relative synchronization. There are two different kinds of systems that can provide all three functions.

A first approach utilizes electric motors capable of being controlled precisely in regard to their rotational speed (r.p.m.), and preferably their rotational location as well—such as servo or stepper motors. Each motor is connected to and controls one camera. Any motor capable of the requisite degree of control and torque can be used, including motors incorporated into or intended for use with existing camera devices, for example, motors controlled by phase lock loop type circuitry. All of the motors are connected to and controlled by appropriate motor control means, (and preferably, also positioning feedback means), including but not limited to "motion control" electronics and/or software, computers, motor drivers, power supplies, and encoders. Existing motor control means can be used, including those originally intended for film camera applications, if they conform to the requirements of the present invention. The rotational speed of the motors, and their synchronization relative to each other is changed and maintained by these motor control means.

Figure 6:
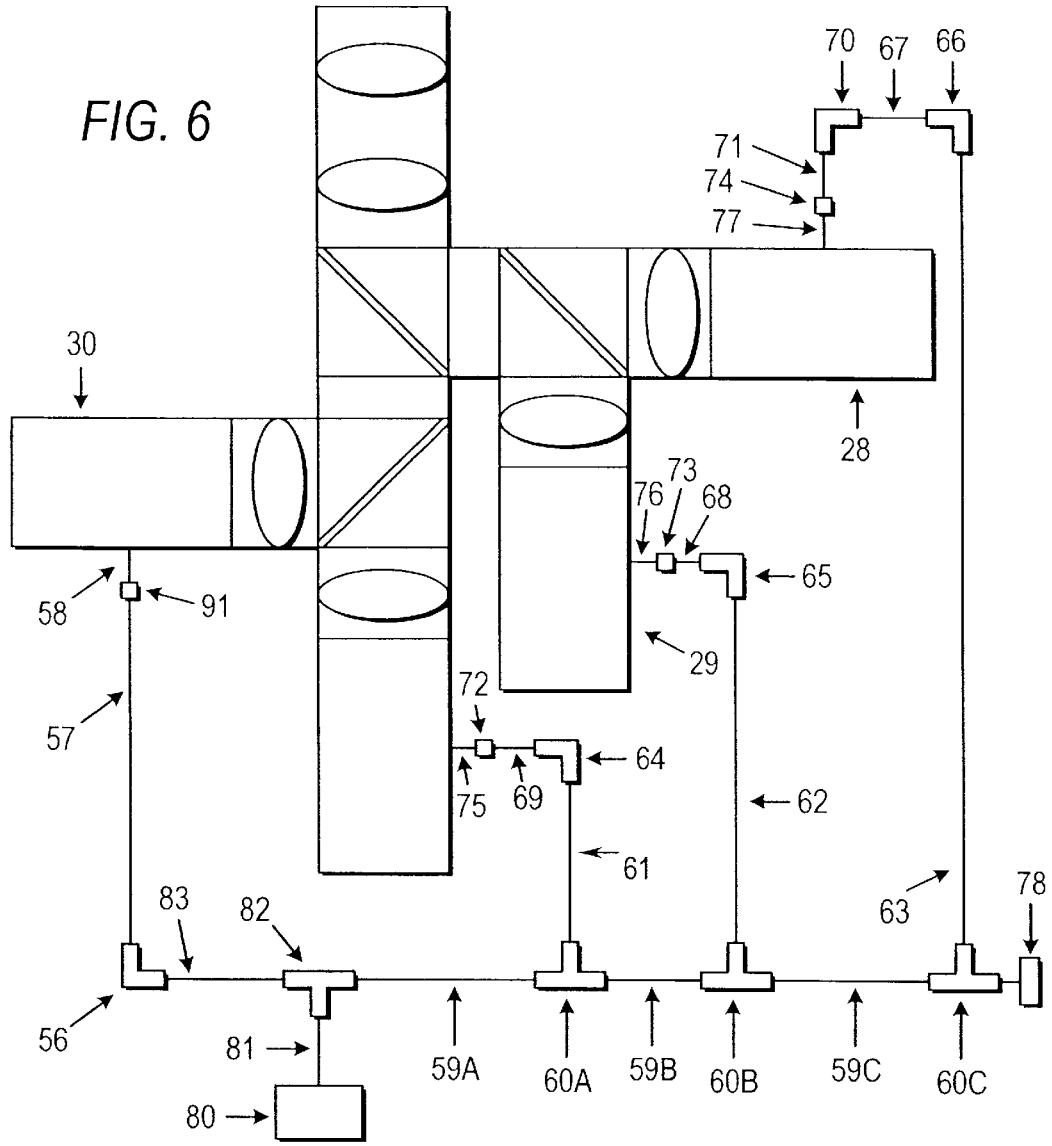
FIG. 6 is an illustration showing a top plan view of a mechanical arrangement for controlling the optical system shown in FIG. 1.

Referring now to FIG. 6, an alternative system for providing camera mechanism motion and synchronization is shown in conjunction with the optical system shown in FIG. 1. A motor's rotational output is divided and transmitted to the cameras by a "power train" of conventional power transmission technology, such as shafts, connectors, gears, and assembled gear and shaft combinations known as "right angle drives". Synchronization of the cameras is changed by making rotational adjustments to components in the power train (e.g. a shaft connector), and maintained by the mechanical integrity of the power train. The "speed" (f.p.s./sampling rate) of the cameras is controlled by the motor, in combination with the possible addition to the power train of speed changing devices such as gears, gears in combination with chains, and geared ratio drive assemblies. In particular, FIG. 6 illustrates the components of a "power train" whose purpose is to transmit rotational mechanical motivation from an electric motor to four motion picture camera mechanisms. An electric motor 80 is connected by a shaft 81 to the input of two output, right angle, geared drive 82. One output of drive 82 is connected by shaft 83 to right-angle geared drive 56, which in turn is connected to shaft 57. Shaft 57 is connected to the input shaft 58 of camera mechanism 30 by adjustable shaft connector 58, which allows the rotational orientation of the camera input shaft to be adjusted relative to the drive shaft.

The second output of drive 82 is connected by shafts 59A, 59B, 59C to a sequence of three right angle drives 60A, 60B, 60C, each having a 1:1 ratio. One output each of drives 60A, 60B, 60C is connected to one of the additional camera mechanisms 28, 29, and 31, by a sequence of power transmission elements similar to those used to connect to camera 30, including: shafts 61, 62, and 63; right-angle geared drives 64, 65, 66, and 70; shafts 67, 68, 69 and 71; adjustable shaft connectors 72, 73, and 74; and camera mechanism input shafts 75, 76, and 77. The additional output of drive 60C may be connected to r.p.m. indicator 78. Note that all of the above described geared right angle drives excepting drives 56 and 70, are the same in regard to the relationship of the direction of the input shaft rotation relative to the direction of the output shaft rotation is the same, whereas in drives 56 and 70 the output shaft rotation is in the opposite direction given the same input shaft rotation as the other drives. The power train described above operates all four camera mechanisms at the same speed.

Figure 7:
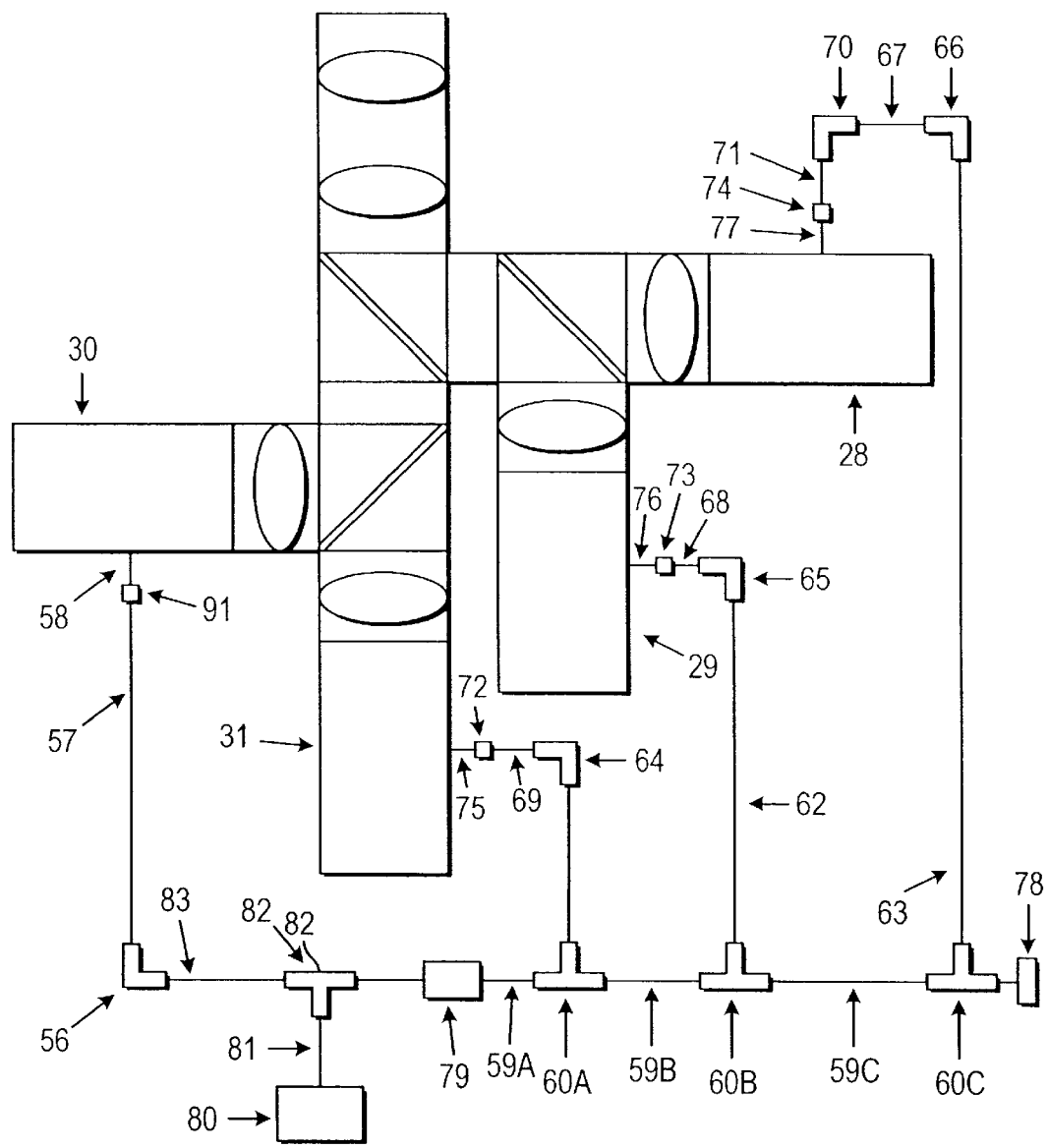
FIG. 7 is an illustration showing a top plan view of a further mechanical arrangement for controlling the optical system shown in FIG. 1.

For certain effects, it is desirable to have one or more camera mechanisms operate at a different "speed" than others. The "power train" shown in FIG. 6 may be modified as shown in FIG. 7 to operate three of the camera mechanisms at a different speed than the fourth camera mechanism. In particular, an 8:1 geared ratio drive 79 is inserted into the power train between drive 82 and drive 60A. Therefore, when electric motor 80 is set to run at 24 r.p.s, one camera mechanism 30 will run at 24 f.p.s. and the three other camera mechanisms 28, 29 31 will run at 3 f.p.s. The exact specifications for a given power train depend on the dimensions of the camera mechanisms, motors, etc., and may require modification depending on the requirements for a particular effect.

Each of the above approaches to providing a combination of mechanical motion, speed control, and synchronization has benefits and drawbacks. A mechanical "power train" solution is simpler, and less expensive than an electronic motor control solution. However, with an electronic control/multiple motor system it is easier and less time consuming to reconfigure the variables of speed and synchronization—different settings can be preprogrammed. The electronic control approach also minimizes the size and mechanical complexity of a system, particularly when motors in addition to the camera motors are required, as they are for certain effects. However, the concept of the invention may employ either a mechanical control or an electronic control, or a combination of both systems.

In instances where the present invention is embodied using electronic imaging/video technology, electronic components possibly including but not limited to time base correction devices and frame store devices are used to adjust and maintain the relative synchronization of the component camera mechanisms.

As described above, the present invention incorporates a shutter device 20, 21, 22, 23 into each of the second sections of the optical relay. Each of these shutter devices is in addition to the conventional adjustable shutter in each of the camera mechanisms 28, 29, 30, 31 associated with that particular optical path. Conventional shutters are sufficient for most purposes and effects. However, certain effects call for very high shutter speeds that exceed the capabilities of conventional camera shutters at a given frame rate. For this purpose, in the present invention, two shutters are employed per optical path—one conventional camera shutter and one additional high speed shutter 20, 21, 22, 23. Each type of shutter possesses different capabilities; capabilities which complement each other. The conventional shutters can intervene for a relatively long time in relation to the overall length of the exposure/film advance cycle. The additional type of shutter can intervene for a relatively short amount of time in relation to the overall length of the exposure cycle while at the same time maintaining the same f.p.s. rate as the conventional shutters. With this arrangement it is necessary for both types of shutter to be open in order to expose the film. On the other hand, only one of the two types of shutters need be closed in order to block exposure. The additional shutters are provided with an actuation means capable of synchronizing precisely the operation of the shutters with the exposure cycles of the related component cameras.

Figure 10:
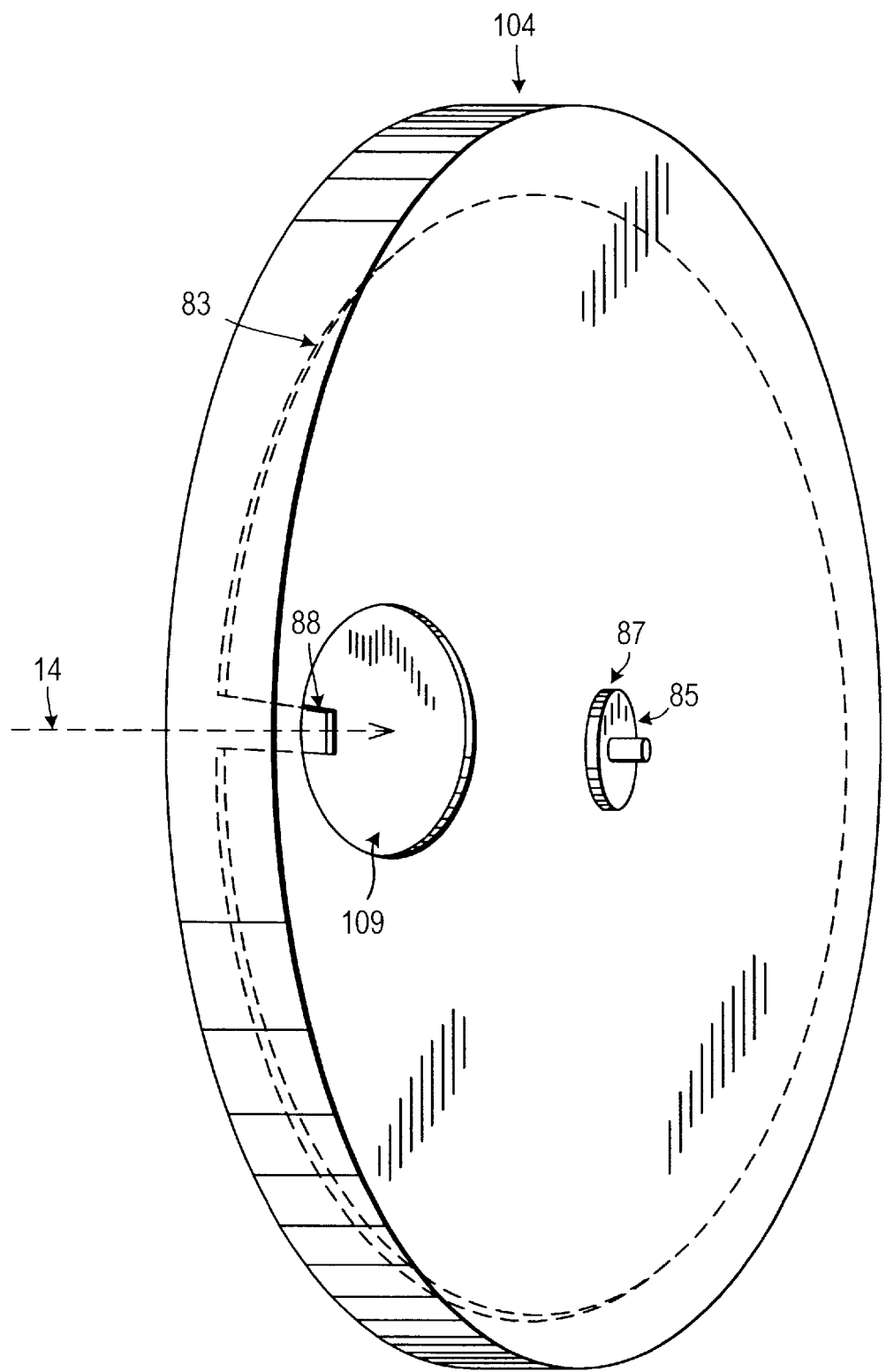
FIG. 10 is a perspective view of a shutter for use in the multiplexed motion picture camera in accordance with one embodiment of the invention.

Two versions of the additional type of shutter are shown in FIGS. 8–11. A first version of the additional shutter known as a "Type A Shutter" is shown in FIGS. 8–9. The shutter comprises a rotating, opaque shutter disc 83, connected by hub 84 to shaft 85, which is supported on both sides of disc 83 by ball bearing pillow blocks 86, 87. Ball bearing pillow blocks 86, 87 attach to shutter disc enclosure 104. The periphery of disc 83 is a solid circular arc, except for aperture 88, and thereby blocks all light from passing along optical axis 14 except when aperture 88 rotates through the axis. In FIG. 10, shutter disc 83 is shown in shutter disc enclosure 104, which blocks all light from reaching disc 83 except for the portion of the shutter disc which is exposed by two identical, aligned cut out areas 109 of enclosure 104, one on each side, whose shape conforms to a transverse profile of enclosure tube 34, onto which shutter 22 is positioned at access slot 39. In a preferred embodiment, a motor and optical encoder combination (not shown) is connected to the section shaft 85 that emerges from disc enclosure 104.

Figure 11:
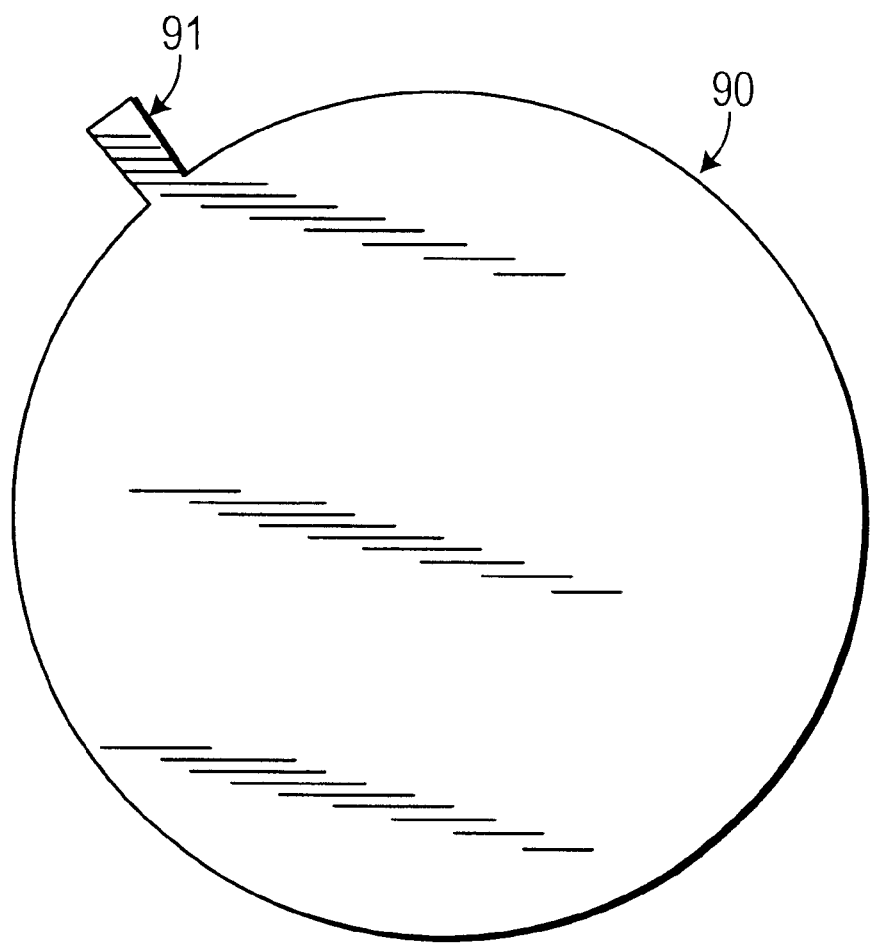
FIG. 11 is an illustration showing a second shutter disc for use in the multiplexed motion picture camera in accordance another embodiment of the invention.

Referring to FIG. 11, a rotating, opaque shutter disc 90 is depicted, representing a second version of the additional type of shutter known as a "Type B Shutter". The two types of shutter, types A and B, are distinguished only by their use of different shutter blades. The solid periphery of rotating, opaque shutter disc 90 is a smaller diameter than that of shutter disc 83, except for segment 91, a wedge segment extension of the flat plane of disc 90 in a shape extending outward the same distance as the larger portion of shutter disc 83. Type B shutters block exposure of the entire image only for a momentary segment of time (i.e., when physical segment 91 passes through the cut out area 109 of enclosure 104) or multiple such segments, of a related, otherwise ongoing conventional exposure.

The specifications for an embodiment of the shutter discs are determined by four factors. The first factor is the duration of the flash burst. In a preferred embodiment, the shutters are compatible with conventional electronic flash technology currently in use in the motion picture industry. The flash burst from those units has a duration of $1/100,000$th of a second. In one embodiment the shutters function for $1/5,000$th of a second—to allow for a significant margin of timing error. Additional means are provided for synchronizing the shutters with the operation of the electronic flash units. For example, an element that actuates an electrical switch can be appended to a shaft connected to the type A shutter, such that a timing signal is sent to the flash device at the exact moment the shutter opens.

The second factor is the f.p.s. rate of the camera associated with a particular shutter. In addition to operating for a short interval of time (a high shutter speed), each of the additional shutters must operate at or as close as possible to the f.p.s. rate of its associated camera. At times that rate will be slow-perhaps 3 f.p.s.-depending on the particular effect sought.

The third factor in determining the specifications of the shutters is a set of requirements peculiar to flash photography. Flash photography is different from photography employing conventional illumination. A conventional rotary motion picture shutter with a narrow enough aperture or slit can provide an effective shutter speed that is very high; i.e., a very short interval of time. Such a shutter could expose a given portion of the frame for $1/5,000$th of a second. But if the aperture is narrow enough the whole frame is not exposed simultaneously. With flash illumination, a partially blocked frame would result, since the flash illumination would end before the shutter had fully traversed the frame. In flash photography in general, and in the case of the type A shutters in particular, it is essential that the shutter be completely clear of the film frame for the entire flash burst. In the case of the type B shutters the opposite is true: the entire area of the frame must be completely covered by the shutter for the entire duration of the flash burst.

The fourth factor is the dimensions of the film format or electronic imaging sensor in question. The actual area to be exposed or blocked will differ, depending on the acquisition format employed, and the specifications for the type A and B shutters will then be different as well. For example, the 16 millimeter film format frame has a vertical dimension of approximately 0.3 inches. With these factors in mind, one embodiment of the present invention employs shutters which are similar to a conventional motion picture camera rotary shutter, but with a significantly larger shutter disc to enable the shutter to generate the desired combination of f.p.s./sampling rate and shutter speed.

The following is an example of a preferred embodiment as configured for the 16 mm film format. In this embodiment, the operative portion of the shutter disc—the part that actually blocks or exposes the frame—has a dimension of twice the height of the frame, or 0.6 inches. Only one half of that dimension, or 0.3 inches, is available to cover or expose the film gate, after taking into account that portion of the shutter blade that is in transit over the frame while the frame is not completely blocked or exposed. It is this 0.3 inch dimension that needs to take $1/5,000$th of a second to traverse the film gate; in other words, to do so at a speed of 1500 inches per second. For this example, it is assumed that the flash will cycle 24 times per second. That means that the shutter disc will rotate at a rate of 24 r.p.s. (revolutions per second), have a circumference of 62.5 inches, and a diameter of about 20 inches. Similar calculations may be made for other film formats (e.g., 35 mm). Adding twenty inch shutter mechanisms to the present invention poses two kinds of practical challenges. First, the shutters, along with the necessary motors, housings, etc., will add mass and weight to the camera device. Secondly, it is difficult to configure the geometry of the image paths and the shutters so that they don't interfere with each other or with the field of view of the objective lens. These problems can be minimized in several different ways.

The first strategy is to maintain the dimensions for the operative portion of the shutter, while simultaneously reducing the diameter of the shutter disc and proportionally increasing its r.p.s. For example, a shutter "speed" of $1/5,000$th of a second can be maintained by cutting the diameter of the shutters discussed above in half, and doubling their r.p.s. to 48. This means that the shutter will block or admit light one extra time for each time that they function in synchronization with the electronic flash lighting. The second strategy also calls for reducing the diameter of the shutter disc, but in this case its r.p.s. is maintained, for example at 24. In compensation, the size of the operative portion of the shutter disc is increased. With this strategy, the number of times and the amount of time that the shutters operate for is maintained, but the amount of time that it takes for the edges of the shutter disc to clear the frame will be increased.

Either of these two strategies will reduce the size of the rotary shutters, but they do not alter the fact that the alignment of a given shutter disc would have to be more or less perpendicular to its associated optical path, and thereby likely to interfere with some other part of the apparatus. It may be desirable therefore to utilize a flexible shutter disc, rather than the traditional rigid type, such that a segment of the rotating shutter close to and including the portion which is intersecting the optical path may be disposed in a flat manner and maintained in a position perpendicular to its associated optical path while at the same time the balance of the disc can be bent or curved in order to prevent it from interfering with other elements of the mechanism. Alternately, the shutter can consist not of a disc at all, but instead may consist of a linear arrangement such as a flat strip joined into a loop. For example, in the case of a flash illumination admitting type A shutter, the strip would be solid and opaque, except for an aperture, perhaps of the same dimensions as that described above for the rotary disc.

Any of these various embodiments of the shutter means can produce the effect in question, but it should be noted that they also produce visual artifacts in the final image. Even when a full size shutter is employed, any non-flash image streams may betray the very brief interruption in their exposure cycles caused by the flash blocking shutters. In any portion of the image that remains stationary the interruption of the exposure period is invisible. But any part of the image which moves will blur, and the resulting blurred areas may evidence the momentary interruption of their exposure caused by the blocking shutter. If the first strategy discussed above is adopted, and the number of shutter cycles per exposure period is increased, the number of artifacts will increase also. If the second strategy is adopted, and the duration of the shutter's intervention increases, the apparent visual size of the artifacts will increase as well. In either case the artifacts are visually insignificant compared to the overall effect. Alternatively, a non-mechanical shutter, for example, an electronic shutter, may be employed. Such a shutter would be smaller, lighter, and quieter, although it would also produce artifacts.

A further advantage of the present invention is that the elements that make up the camera are modular to provide a broad range of flexibility to the camera operator. For example, the optical relays are modular units comprising: a lens mounting port; a first lens element; a prism beam splitter arrangement; multiple second relay lens elements; and multiple lens attachment mounts, such as are found on the rear of interchangeable camera objective lenses. Optionally, the relay module may also include means for adjusting the focus of the second relay elements, including motor control. A second modular element is the support structure, such as platform 43, for supporting all of the modular elements. This support structure includes multiple conventional mounting devices compatible with current moving image camera mechanisms, such as sliding base plates (not shown). The camera mounting devices are positioned such that when a camera mechanism is mounted on each of them, each camera mechanism is aligned with one of the optical relay's multiple lens attachment mounts. The mounting devices are further capable of adjusting the position of the camera mechanism forward and backward relative to the lens attachment mount, and parallel to the optical axis of the associated branch of the optical relay, to enable the camera mechanism to be moved onto and off of the relay without damaging either the lens port on the camera mechanism or the lens attachment mount. A third type of modular element is the camera mechanism. A fourth modular element is an electronic motor control device capable of simultaneously controlling the motors in multiple camera mechanisms in regard to their rotation and their position. Optionally, this motor control device may be capable of controlling in a similar fashion any additional motors utilized for additional functions, such as focus adjustment or additional shutter actuation. This motor control device may be compatible with motors conventionally utilized in conjunction with existing cameras, and/or with motors specially adapted to use with the present invention. Preferably but not necessarily, position feedback means are also included in the device.

Additional advantages of the multiplexed motion picture camera described above will now be described with reference to its operation. One such advantage is the camera's ability to create unique flash effects. For example, the camera can emulate a common still photography effect. Still photographers often deal with the difficulty of photographing a subject at night by combining in one exposure: low level ambient light captured with a long exposure, and the nearly instantaneous burst of light from an electronic flash. Because the present invention is able to make physically separate records of conventional and electronic flash lighting, it is able to expose for each of them in an appropriate manner. In one version of the flash effect, one or more of the component camera mechanisms operates at a relatively slow frame rate so that its integral conventional shutter(s) makes long exposures. Long exposures are made in order to record the normal and/or ambient lighting. An additional component camera mechanism operates at a normal frame rate, and while doing so exposes its film for only a fraction of a second at a time, in order to capture a minimum of the normal and/or ambient light at the same time that it is capturing all of the flash illumination.

Figure 12:
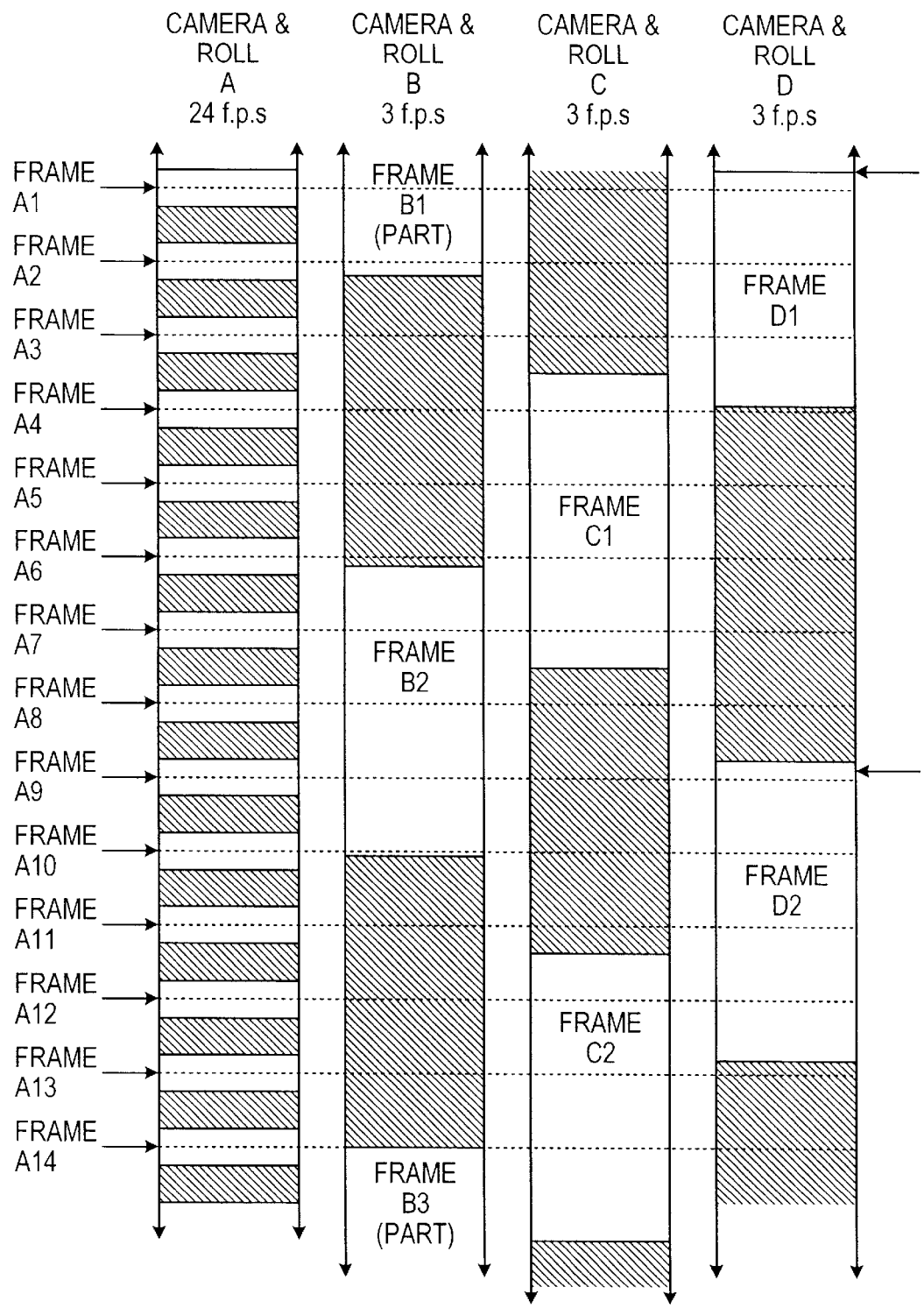
FIG. 12 is an illustration showing the timing and length of exposure cycles of exemplary image recording devices used in a multiplexed motion picture camera in accordance with one embodiment of the invention.

Referring now to FIG. 12, the timing and length of the exposure cycles of four camera mechanisms and each of their associated rolls of film (labeled "A", "B", "C" and "D") as configured for the electronic flash effect is illustrated. In this example, one camera mechanism/roll (labeled "A") is designated to record the flash illumination and is set to run at 24 f.p.s. At the same time, three other camera mechanisms and their associated rolls of film are capturing the non-flash illumination utilizing an overlapping sequence of long exposures. Each of those (labeled "B", "C" and "D") is running at 3 f.p.s., and exposing each frame for about ⅙th of a second. The optical and mechanical arrangement shown in FIG. 7 may be used for this example. Each of the columns represents one mechanism and its associated roll of film. The dark gray rectangles in each column represent the time during which the shutter of the camera mechanism is closed, and the intermittent movement is advancing the film for the next exposure. The white rectangles represent the time during which the shutter is open and the film is being exposed.

Note that this is a graphical representation of the timing of the various elements involved in the effect, not a representation of the physical attributes of the actual rolls of film. The rectangles for the frames of roll "A" are smaller because, at 24 f.p.s., camera "A" is running three times faster than the others and consequently their exposure period is shorter—not because the actual frames are smaller. The size of the gray rectangles reflects the fact that the amount of time it takes most camera mechanisms to advance the film is the same as the amount of time it takes to expose it. The actual physical distance between the frames on a roll of film is determined by the film advance mechanism, and conforms to the standard inter-frame distance for that particular film format.

The horizontal dotted lines represent the moment during which the electronic flash cycles, the flash admission shutter is in operation on roll A, and the blocking shutters are in operation on camera/rolls B, C and D. They are meant to suggest the amount of time the exposure is admitted/blocked by the additional shutters in comparison to the total exposure interval for each frame. They do not illustrate the visual artifacts of the operation of the blocking shutters left on the frames in rolls B, C and D.

Figure 13:
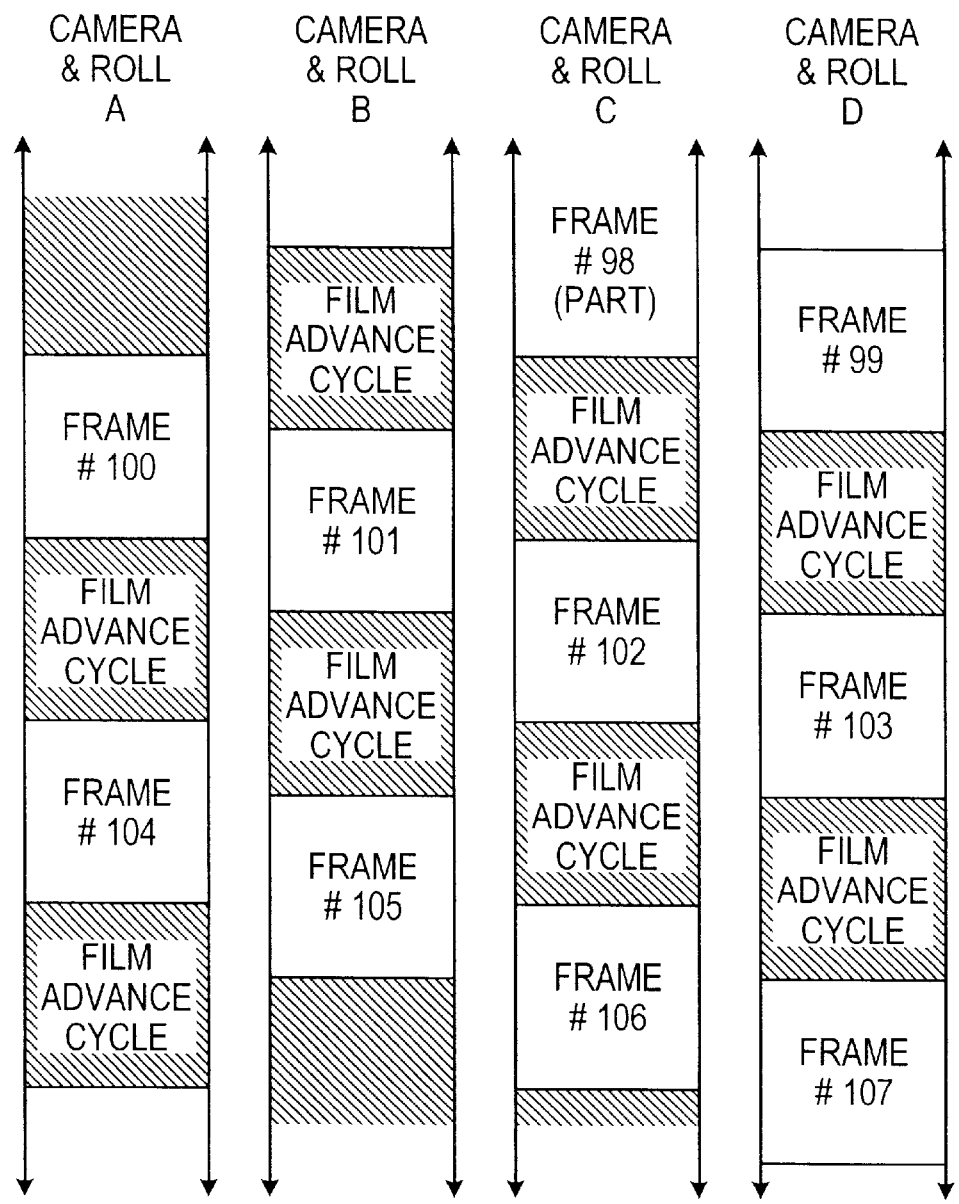
FIG. 13 is an illustration showing the timing and length of exposure cycles of exemplary image recording devices used in a multiplexed motion picture camera in accordance with another embodiment of the invention.

Another example of the camera's operation is illustrated in FIG. 13, wherein the camera photographs a scene and then the resulting separate images are combined into a finished effect. In this aspect more than one image of the subject is being recorded at all times, and the result is moving images which have a more "fluid" or "flowing" quality than those produced by conventional means and methods. The effect is created by offsetting the exposure cycles of three or four camera mechanisms to record overlapping segments of real time, each segment being recorded as a discrete image on one of several rolls of film or electronic image sequence recordings. The optical and mechanical arrangement shown in FIG. 6 may be used for this example. Referring now to FIG. 13, a method is depicted for controlling the timing and length of the exposure cycles of four film camera mechanisms and each of their associated rolls of film (labeled "A", "B", "C" and "D") as they are configured for one version of this overlapped exposure effect. In this example, the present invention is configured to expose an overlapping sequence of frames. The exposure period for each frame commences half way through the exposure of the preceding frame. In this manner, two frames are being exposed at all times. This synchronization pattern can be used at various frame rates.

Note that this is a graphical representation of the timing of the various elements involved in the effect, not a representation of the physical attributes of the actual rolls of film. The dark gray rectangles in each column represent the time during which the shutter of that particular camera mechanism is closed, and the intermittent movement is advancing the film for the next exposure. The white rectangles represent the time during which the shutter is open and the film is being exposed. The size of the gray rectangles in this drawing reflects the amount of time it takes most camera mechanisms to advance the film is the same as the amount of time it takes to expose it. The actual physical distance between the frames on a roll of film is determined by each camera's film advance mechanism in accordance with the standards for that particular film format.

Halfway through the exposure of frame #100 on roll A, exposure of the succeeding frame (frame #101) begins on roll B. At the same moment, on roll D, the exposure of the preceding frame (#99) ends. Halfway through the exposure of frame #101, exposure of frame #102 begins on roll C. During the exposure of frame #102 the shutter/intermittent for roll A advances, in preparation for exposing frame #104, etc.

Subsequently, during editing or post-production, the resulting images representing overlapping segments of real time, are reproduced in order. The effect can be varied, depending on whether the images are overlapped visually, or reproduced as a series of distinct images as they would be in a conventional film or video sequence. The effect is most apparent when the images are both recorded and reproduced at a slower than normal frame rate such as four f.p.s., and they are overlapped visually—in traditional editing parlance, "dissolved" rather than "cut" together.

Figure 14:
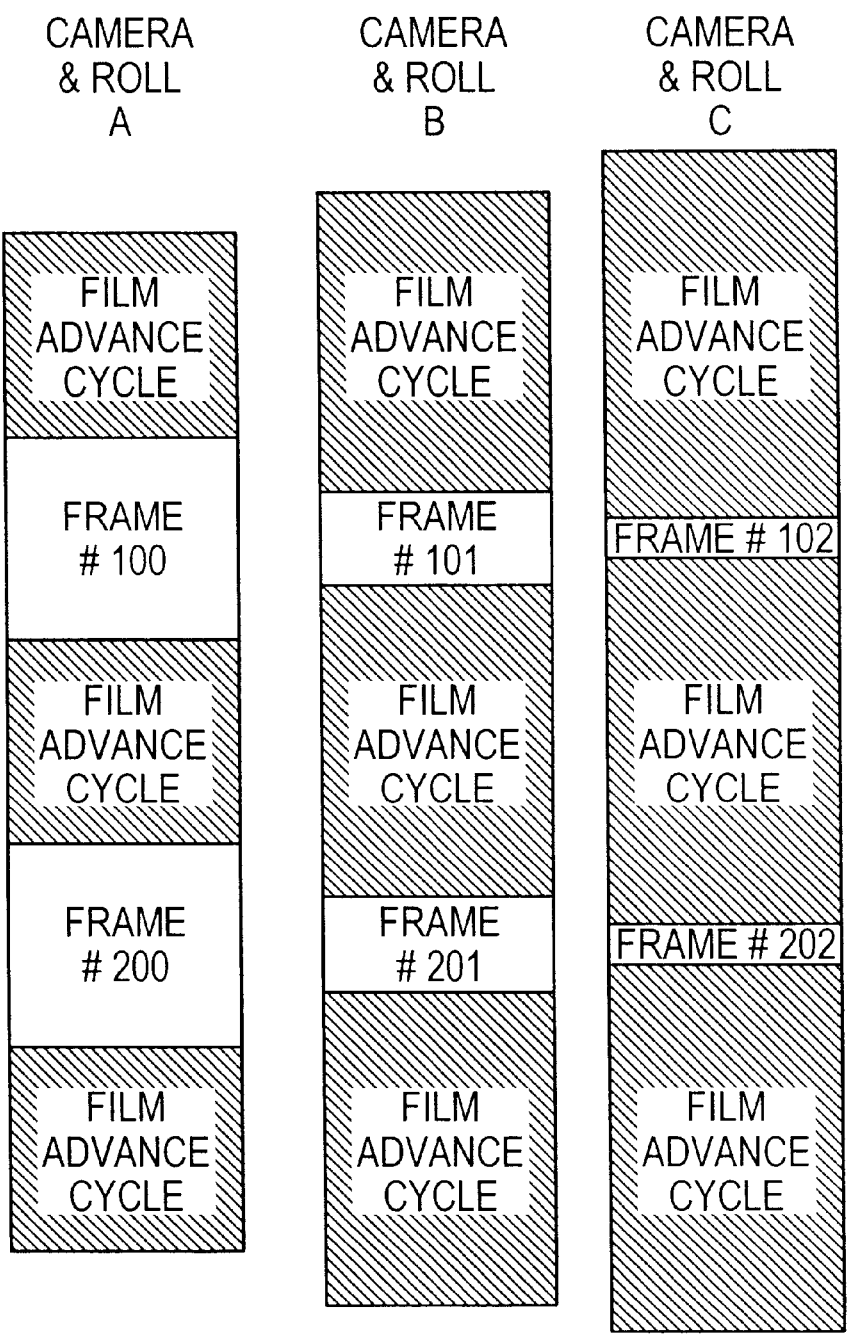
FIG. 14 is an illustration showing the timing and length of exposure cycles of exemplary image recording devices used in a multiplexed motion picture camera in accordance with a further embodiment of the invention.

A further example of the camera's ability to produce a finished effect by combining separate images is shown in FIG. 14. In this example, multiple images are recorded simultaneously with the significant difference between them being different levels of exposure. The result is significantly greater control for the operator over the contrast and brightness characteristics of the resulting images. The effect is created by aligning the exposure cycles of two to four camera mechanisms—film or electronic imaging—to record matching segments of real time, each camera mechanism recording a discrete image on its associated roll of film or electronic image recording medium. The optical and mechanical arrangement shown in FIG. 6 may also be used for this example.

Referring now to FIG. 14, a method is depicted for controlling the timing and length of the exposure cycles of three film camera mechanisms and each of their associated rolls of film (labeled "A", "B", and "C") as they are configured for one version of this exposure control effect. In this example, the f.p.s./sampling rate of all of the camera mechanisms is the same, and all of the camera mechanisms are synchronized to operate simultaneously. For this effect, the conventional motion picture camera shutters in each of the camera mechanisms is employed. Each camera mechanism employs a different "shutter speed", which actually means a different shutter angle, or angle of opening in the rotating shutter disc. In this version of the effect, and because of the nature of these shutters, and their relationship to the associated film advance mechanisms, it is the halfway point in each exposure period that is synchronized with the halfway points in the other exposures. The exposures of frame #100 on roll A, frame #101 on roll B, and frame #102 on roll C are synchronized. The different durations of these exposures is reflected in the different sizes of the white rectangles.

Note that FIG. 14 is a graphical representation of the timing of the various elements involved in the effect, not a representation of the physical attributes of the actual rolls of film. The dark gray rectangles in each column represent the time during which the shutter of that particular camera mechanism is closed, and the intermittent movement is advancing the film for the next exposure. The white rectangles represent the time during which the shutter is open and the film is being exposed. The exposures of frames #200 on roll A, frame #201 on roll B, and frame #202 on roll C, follow, and etc. This synchronization pattern can be used at various frame rates.

Subsequently, each set of simultaneously captured images reflecting different levels of exposure are combined, and then reproduced in order. Such combination can be effected in a virtually infinite variety of ways, with equally varied results. The variety of means capable of effecting such combination is also quite varied, and may include electronic luminance key processing. This effect is particularly suited to being used in an embodiment of the present invention that includes image combination and/or processing means, and possibly does not include multiple recording means. It is so suited in part because it addresses a fundamental and reoccurring problem of photography, which results from the fact that the illumination contrast range of subjects typically exceeds the illumination contrast recording capabilities of film and video. It is also suited to real time application in an embodiment of the present invention because it requires relatively limited image processing capability; because it would be very valuable to operators even without the inclusion of additional effect capabilities and the resulting need for additional image processing means; and because it requires relatively little participation by the operator in order to be valuable.

A potentially unlimited number of different strategies for combining images might be applied to the multiple image sequences produced by the present invention. For this reason, this disclosure does not set forth any preferred image processing or image combination means. Obviously, combining the camera of this invention with film image combination means in one device would be impractical with film technology. However, even with an electronic imaging/video embodiment of the invention, there are good reasons to record the multiple image sequences and thereby forestall the process of combining them. With recorded images, an operator can potentially access the best and the largest number of image processing means. Furthermore, decisions about how to manipulate and combine images can be made independent from the practical and temporal exigencies of the photography process.

Although the invention has been described with reference to preferred embodiments, it will be appreciated by one of ordinary skill in the art that numerous modifications are possible in light of the above disclosure. All such variations and modifications are intended to be within the scope and spirit of the invention as defined in the claims appended hereto.

I claim:

1. A multiplexed motion picture camera, comprising:
    a common objective lens facing a scene to be photographed and forming an image bearing scene light beam;
    a beam splitter for receiving the scene light beam from the objective lens, dividing the scene light beam into at least two secondary scene light beams, and directing the secondary scene light beams to at least two respective image planes;
    a first scene light capture means arranged in a first of the at least two respective image planes to capture at least a first aspect of the scene;
    a second scene light capture means arranged in a second of the at least two respective image planes to capture at least a second aspect of the scene; and
    a control means for separately adjusting a frame rate of the first scene light capture means and a frame rate of the second scene light capture means, and for independently adjusting when a first exposure cycle of the first scene light capture means occurs relative to when a second exposure cycle of the second scene light capture means occurs, such that the first and second exposure cycles may occur at the same time or at offset times.

2. The multiplexed motion picture camera of claim 1, further comprising at least one optical relay disposed between the objective lens and at least one of the at least two image planes.

3. The multiplexed motion picture camera of claim 2, wherein the optical relay comprises a field lens disposed between the objective lens and the beam splitter and a relay lens disposed between the beam splitter and at least one of the at least two image planes.

4. The multiplexed motion picture camera of claim 1, further comprising a second beam splitter disposed between the beam splitter and one of the image planes to receive and divide one of the at least two secondary scene light beams into at least two tertiary scene light beams, the second beam splitter directing the tertiary scene light beams to a second set of at least two respective image planes.

5. The multiplexed motion picture camera of claim 3, wherein the position of the relay lens defines a focal plane for one of the secondary scene light beams in the first scene light capture means which is different from a focal plane of another of the secondary scene light beams in the second scene light capture means, such that each of the at least two image planes has a different focus setting.

6. The multiplexed motion picture camera of claim 3, wherein the relay lens is movable, such that its position is adjustable.

7. The multiplexed motion picture camera of claim 1, further comprising at least one shutter disposed between the beam splitter and the first or second scene light capture means.

8. The multiplexed motion picture camera of claim 1, wherein the scene light capture means are selected from a group of image recording devices consisting of black and white or color photographic film camera mechanisms, electronic imaging camera mechanisms and camera mechanisms capable of recording a motion picture sequence on film or capturing a motion picture sequence capable of being recorded on an electronic format.

9. The multiplexed motion picture camera of claim 8, wherein the first and second scene light capture means are photographic film camera mechanisms each having a shutter and an intermittent film advance mechanism.

10. The multiplexed motion picture camera of claim 9, wherein the control means advances film in the first scene light capture means at a speed greater than the second scene light capture means.

11. The multiplexed motion picture camera of claim 9, wherein the control means comprises a motor connected to each of the scene light capture means through a power train arranged to provide mechanical motion to the shutter and film advance mechanism in each of said scene light capture means, the arrangement of the power train determining when the first exposure cycle occurs relative to when the second exposure cycle occurs.

12. The multiplexed motion picture camera of claim 9, wherein the control means comprises a separate motor connected to each of the scene light capture means, and an electronic means for separately controlling the speed and timing of the motor associated with each of the scene light capture means, such that each of the scene light capture means is separately adjustable.

13. A multiple image device for use with an objective lens and a plurality of camera mechanisms, each of said camera mechanisms having a lens mounting port and at least one image detecting plane, said device comprising:
    a lens mounting port for mounting said objective lens;
    a primary beam splitter for receiving a scene light beam from said objective lens and dividing said scene light beam into at least two secondary scene light beams;
    a plurality of lens mount fittings for connecting said camera mechanisms to the device such that said objective lens forms an image in the image detecting plane of each of the camera mechanisms, said lens mount fittings being engageable with the lens mounting port on the camera mechanisms; and
    a control means for separately adjusting a frame rate of a first of the camera mechanisms and a frame rate of a second of the camera mechanisms, and for independently adjusting when a first exposure cycle of the first of the camera mechanisms occurs relative to when a second exposure cycle of the second camera mechanisms occurs, such that the first and second exposure cycles may occur at the same time or at offset times.

14. The multiple image device according to claim 13, further comprising a second beam splitter disposed to receive and divide one of the at least two secondary scene light beams into at least two tertiary scene light beams.

15. The multiple image device according to claim 13, further comprising at least one optical relay disposed between the lens mounting port and the lens mount fittings.

16. The multiple image device according to claim 15, wherein the optical relay comprises a field lens disposed between the lens mounting port and the primary beam splitter and a relay lens disposed between the primary beam splitter and at least one of the lens mount fittings.

17. The multiple image device according to claim 16, wherein the relay lens is movable such that its position is adjustable.

18. The multiple image device according to claim 13, further comprising a common support for said plurality of camera mechanisms and said multiple image device, said camera mechanisms being adjustably and removably connected to the support.

19. The multiple image device according to claim 18, wherein the common support comprises a rigid plate.

20. The multiple image device of claim 13, further comprising at least one shutter disposed between the primary beam splitter and the at least one image detecting plane, wherein the shutter defines an exposure time for the at least one image detecting plane that is different from an exposure time defined by a camera shutter incorporated into the camera mechanisms.

21. The multiple image device of claim 13, wherein the camera mechanisms are selected from a group of image recording devices consisting of black and white or color photographic film camera mechanisms, electronic imaging camera mechanisms and camera mechanisms capable of recording a motion picture sequence on film or capturing a motion picture sequence capable of being recorded on an electronic format.

22. The multiple image device of claim 13, wherein the camera mechanisms are photographic film camera mechanisms each having a shutter and an intermittent film advance mechanism.

23. The multiple image device of claim 22, wherein the control means advances film in a first of the camera mechanisms at a speed greater than a second of the camera mechanisms.

24. The multiple image device of claim 22, wherein the control means comprises a motor connected to each of the camera mechanisms through a power train arranged to provide mechanical motion to the shutter and film advance mechanism in each of said camera mechanisms, the arrangement of the power train determining when the first exposure cycle occurs relative to when the second exposure cycle occurs.

25. The multiple image device of claim 22, wherein the control means comprises a separate motor connected to each of the camera mechanisms, and an electronic means for separately controlling the speed and timing of the motor associated with each of the camera mechanisms, such that each of the camera mechanisms is separately adjustable.

26. A method for recording a plurality of image sequences from a primary image originally formed by a common objective lens, the method comprising the steps of:

dividing the primary image into at least two secondary image-bearing scene light beams;

adjusting a first scene light capture means to capture a first of the secondary scene light beams at a first frame rate and a first exposure cycle;

adjusting a second scene light capture means to capture a second of the secondary scene light beams at a second frame rate and a second exposure cycle;

exposing the first scene light capture means to the first of the secondary scene light beams to form a first image sequence; and exposing the second scene light capture means to the second of the secondary scene light beams to form a second image sequence, such that the first and second scene light capture means may be exposed to the first and second secondary scene light beams at the same time or at offset times.

27. The method according to claim 26, wherein the first frame rate and the second frame rate are selectably adjusted to be the same.

28. The method according to claim 26, wherein the first frame rate and the second frame rate are selectably adjusted to be different.

29. The method according to claim 26, wherein the first exposure cycle and the second exposure cycle are selectably adjusted to be the same, such that the first image sequence and the second image sequence reflect the same sequence of real time intervals.

30. The method according to claim 26, wherein the first exposure cycle and the second exposure cycle are selectably adjusted to be different, such that the first image sequence and the second image sequence reflect different sequences of real time intervals.

31. The method according to claim 30, wherein the sequences of real time intervals are or include a sequence of overlapping intervals.

32. The method according to claim 26, further comprising selectably adjusting the focal characteristics of the first or second secondary scene light beams before exposure to the scene light capture means, such that the first image sequence and the second image sequence reflect different focus settings.

33. The method according to claim 26, further comprising coordinating the timing of a series of flash lighting bursts with operation of the first scene light capture means.

34. The method according to claim 33, further comprising blocking the second scene light capture means for an interval which coincides with each of the flash lighting bursts.

35. The method according to claim 34, wherein the duration of said blocking is substantially equal to or greater than the duration of the flash bursts.

36. The method according to claim 26, further comprising selectably adjusting the intensity of the first secondary image to be different than the intensity of the second secondary image.

37. The multiplexed motion picture camera of claim 4, further comprising a third beam splitter disposed between the beam splitter and a second of the image planes to receive and divide a second of the at least two secondary light beams into a second set of at least two tertiary scene light beams, the third beam splitter directing the second set of tertiary scene light beams to a third set of at least two respective image planes.

38. The multiplexed motion picture camera of claim 37, further comprising a third scene light capture means arranged in a second of the at least two respective tertiary image planes and a fourth scene light capture means arranged in a second of the second set of image planes.

39. The multiplexed motion picture camera of claim 38, wherein the control means separately adjusts a frame rate of each of the scene light capture means and independently adjusts the timing of when an exposure cycle of each of the scene light capture means occurs relative to each other.

40. The multiplexed motion picture camera of claim 38, further comprising at least one optical relay disposed between the objective lens and at least one of the at least two image planes.

41. The multiplexed motion picture camera of claim 40, wherein the optical relay comprises a field lens disposed between the objective lens and the beam splitter and at least one relay lens disposed between either the second or third beam splitter and one of the tertiary image planes.

42. The multiplexed motion picture camera of claim 41, wherein the relay lens is adjustably positioned along the tertiary scene light beams to provide a different focus setting in each of the tertiary image planes.

43. The multiplexed motion picture camera of claim 38, further comprising a multiple axis optical relay, the optical relay comprising a field lens disposed between the objective lens and the beam splitter and at least one relay lens movably disposed between either the second or third beam splitter and one of the tertiary image planes, such that its position along the tertiary scene light beams is adjustable to provide a different focus setting in each of the tertiary image planes.

44. The multiplexed motion picture camera of claim 43, wherein a first and second of the relay lenses are disposed respectively between the second beam splitter and the second set of at least two respective tertiary image planes.

45. The multiplexed motion picture camera of claim 44, wherein a third and fourth of the relay lenses are disposed respectively between the third beam splitter and the third set of at least two respective tertiary image planes.

46. The multiplexed motion picture camera of claim 43, further comprising at least one shutter disposed between either the second or third beam splitter and one of the tertiary image planes.

47. The multiplexed motion picture camera of claim 46, wherein first and second shutters are disposed respectively between the second beam splitter and the at least two respective tertiary image planes, and third and fourth shutters are disposed respectively between the third beam splitter and the second set of at least two respective tertiary image planes.

48. The multiplexed motion picture camera of claim 46, wherein the control means separately controls the operation of each of the at least one shutters and each of the scene light capture means.

49. The multiplexed motion picture camera of claim 38, wherein the scene light capture means are photographic film camera mechanisms each having a shutter and an intermittent film advance mechanism.

50. The multiplexed motion picture camera of claim 49, wherein the control means comprises a motor connected to each of the scene light capture means through a power train arranged to provide mechanical motion to the shutter and film advance mechanism in each of the scene light capture means, the arrangement of the power train determining when the exposure cycle of each of the scene light capture means occurs relative to each other.

51. The multiplexed motion picture camera of claim 49, wherein the control means comprises a separate motor connected to each of the scene light capture means, and an electronic means for separately controlling the speed and timing of the motor associated with each of scene light capture means, such that each of the scene light capture means is separately adjustable.

52. The multiplexed motion picture camera of claim 7, wherein the shutter is arranged to block at least one of the secondary scene light beams for a period of time substantially equal to or greater than the duration of an electronic flash burst.

53. The multiplexed motion picture camera of claim 7, wherein the shutter is arranged to admit at least one of the secondary scene light beams for a period of time substantially equal to or greater than the duration of an electronic flash burst.

54. The multiplexed motion picture camera of claim 7, wherein the shutter is arranged to block at least one of the secondary scene light beams for a period of time substantially equal to or less than $1/1,000^{th}$ of a second.

55. The multiplexed motion picture camera of claim 7, wherein the shutter is arranged to admit at least one of the secondary scene light beams for a period of time substantially equal to or less than $1/1,000^{th}$ of a second.

56. The multiple image device according to claim 13, further comprising a light blocking enclosure encompassing the beam splitter and connected to the lens mounting port and the plurality of lens mount fittings such that substantially all light is excluded when the device is in use with the exception of said scene light beam.

57. The multiple image device of claim 20, wherein the shutter is arranged to block at least one of the secondary scene light beams for a period of time substantially equal to or greater than the duration of an electronic flash burst.

58. The multiple image device of claim 20, wherein the shutter is arranged to admit at least one of the secondary scene light beams for a period of time substantially equal to or greater than the duration of an electronic flash burst.

59. The multiple image device of claim 20, wherein the shutter is arranged to block at least one of the secondary scene light beams for a period of time substantially equal to or less than $1/1,000^{th}$ of a second.

60. The multiple image device of claim 20, wherein the shutter is arranged to admit at least one of the secondary scene light beams for a period of time substantially equal to or less than $1/1,000^{th}$ of a second.

61. The method according to claim 31, wherein the overlapping intervals are continuous.

62. The method according to claim 26, further comprising the steps of:
reforming the primary image formed by the objective lens with a field lens into an image-bearing scene light beam; and
reforming the secondary image-bearing scene light beams with a relay lens into a first secondary image and a second secondary image.

63. The method according to claim 32, wherein the focal characteristics are adjusted by adjusting the position of a relay lens.

64. The method according to claim 34, wherein the interval minimizes admission of the second of the scene light beams during each of the flash lighting bursts and maximizes admission of the second of the scene light beams at other times.

65. The method according to claim 33, wherein at least one of the series of flash lighting bursts is synchronized to occur during formation of each image in the first image sequence.

66. The method according to claim 33, further comprising admitting the first scene light beam into the first scene light capture means for an interval which maximizes the admission of the first scene light beam during each of the flash lighting bursts and minimizes the admission of the first scene light beam at other times.

67. The method according to claim 26, wherein the first exposure cycle and the second exposure cycle are a minimum of 24 frames per second.

68. The method according to claim 26, wherein the first frame rate and second frame rate are the same, the first exposure cycle occurs at the same time as the second exposure cycle, and further comprising the step of blocking the second scene light capture means for an interval which coincides with a series of flash lighting bursts, and admitting the flash lighting bursts into the first scene light capture means during the interval.

* * * * *